(12) United States Patent
Migos et al.

(10) Patent No.: US 10,699,063 B2
(45) Date of Patent: Jun. 30, 2020

(54) AUTHORING CONTENT FOR DIGITAL BOOKS

(75) Inventors: Charles J. Migos, San Bruno, CA (US); Diego Bauducco, San Francisco, CA (US); Markus Hagele, San Francisco, CA (US); Jay C. Capela, Santa Cruz, CA (US); Gary W. Gehiere, Campbell, CA (US); Alexander C. MacLean, Cupertino, CA (US); Jacob G. Refstrup, Vancouver, WA (US); Christopher E. Rudolph, Camas, WA (US); Peter W. Rapp, Pittsburgh, PA (US); David M. Hall, Brush Prairie, WA (US); Peter G. Berger, Irwin, PA (US); Simon A. Ward, Camas, WA (US); Steven J. Israelson, Vancouver, WA (US); Mark Ambachtsheer, Vancouver, WA (US); Paul Elseth, Washougal, WA (US); Roger Rock Rosner, Mountain View, CA (US); Yaniv Gur, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 812 days.

(21) Appl. No.: 13/588,411

(22) Filed: Aug. 17, 2012

(65) Prior Publication Data

US 2013/0073998 A1    Mar. 21, 2013

Related U.S. Application Data

(60) Provisional application No. 61/588,562, filed on Jan. 19, 2012, provisional application No. 61/525,695, filed on Aug. 19, 2011.

(51) Int. Cl.
*G06F 40/166* (2020.01)
*G06F 40/106* (2020.01)

(52) U.S. Cl.
CPC .......... *G06F 40/166* (2020.01); *G06F 40/106* (2020.01)

(58) Field of Classification Search
CPC ...... G06F 17/211; G06F 17/24; G06F 3/0484; G06F 40/166
(Continued)

(56) References Cited

U.S. PATENT DOCUMENTS 4,723,211 A * 2/1988 Barker .................. G06F 17/211
715/210
5,337,406 A * 8/1994 Takakura et al. ............. 715/202
(Continued)

FOREIGN PATENT DOCUMENTS

WO    WO 2011/008862    1/2011

OTHER PUBLICATIONS

Nancy Conner et al., "Office 2010: The Missing Manual," Jul. 16, 2010, O'Reilly Media, Inc., Chapters 2, 3, 6, and 29.*
(Continued)

*Primary Examiner* — Dino Kujundzic
(74) *Attorney, Agent, or Firm* — Fish & Richardson P.C.

(57) ABSTRACT

This disclosure describes systems, methods, and computer program products for authoring content for digital books. In some implementations, a single graphical user interface (GUI) is presented that allows an author to design a layout for the digital book, including editing text and inserting various types of interactive elements in the text. The GUI functions as both a digital book layout design tool and a word processor to facilitate the building of a digital book. The relative page location of inserted widgets can be determined by a user-selectable anchor point placed within the
(Continued)

text. An outline view of the digital book can be created and presented in the GUI based on a hierarchical structure determined by paragraph styles applied to the text. The GUI can provide a hybrid glossary and index page for allowing the author to create and manage a glossary and index for the digital book.

36 Claims, 33 Drawing Sheets

(58) Field of Classification Search
USPC .................................................. 715/764, 776
See application file for complete search history.

(56) References Cited

U.S. PATENT DOCUMENTS

| | | | | |
|---|---|---|---|---|
| 5,459,827 | A * | 10/1995 | Allouche | G06F 17/211 715/204 |
| 5,555,369 | A * | 9/1996 | Menendez | G06F 8/34 715/762 |
| 5,581,686 | A * | 12/1996 | Koppolu | G06F 3/0481 715/784 |
| 5,835,919 | A * | 11/1998 | Stern | G06F 3/0481 715/209 |
| 5,838,906 | A * | 11/1998 | Doyle | G06F 9/5027 715/205 |
| 6,061,696 | A * | 5/2000 | Lee | G06F 17/211 715/209 |
| 6,182,095 | B1 * | 1/2001 | Leymaster | G06F 17/243 706/46 |
| 6,462,756 | B1 * | 10/2002 | Hansen et al. | 715/764 |
| 6,513,042 | B1 * | 1/2003 | Anderson | G06Q 20/101 |
| 6,826,727 | B1 * | 11/2004 | Mohr | G06F 17/211 382/180 |
| 6,844,940 | B2 | 1/2005 | Warmus et al. | 358/1.18 |
| 8,078,963 | B1 * | 12/2011 | Rosner et al. | 715/255 |
| 8,095,949 | B1 * | 1/2012 | Hendricks | H04N 5/4403 345/901 |
| 9,459,773 | B2 * | 10/2016 | Hyun | G06F 3/0484 |
| 2002/0087560 | A1 | 7/2002 | Bardwell | G09B 7/00 |
| 2003/0018663 | A1 * | 1/2003 | Cornette | G06F 17/21 715/202 |
| 2005/0108278 | A1 * | 5/2005 | Jones | G06F 17/211 |
| 2005/0223023 | A1 * | 10/2005 | King | G06F 17/30893 |
| 2005/0257158 | A1 * | 11/2005 | Lombardo | 715/751 |
| 2007/0294619 | A1 * | 12/2007 | Krishnaswamy | G06F 17/211 715/704 |
| 2008/0178069 | A1 * | 7/2008 | Stallings | G06Q 10/10 715/202 |
| 2008/0270930 | A1 * | 10/2008 | Slosar | 715/776 |
| 2009/0172559 | A1 * | 7/2009 | Waldman | G06F 17/211 715/744 |
| 2011/0041052 | A1 * | 2/2011 | Fraisl | G06F 17/21 715/234 |
| 2011/0179350 | A1 * | 7/2011 | Capela et al. | 715/244 |
| 2014/0030691 | A1 * | 1/2014 | Liu | G09B 5/02 434/365 |
| 2015/0206447 | A1 * | 7/2015 | Vahid | G06F 3/0486 434/362 |
| 2016/0049083 | A1 * | 2/2016 | Brinton | G09B 5/12 434/309 |

OTHER PUBLICATIONS

Herb Tyson, "Microsoft Word 2010 Bible," Jun. 21, 2010, John Wiley & Sons, pp. 425-429, 433-435.*
innovativeteach, "How to make Interactive Quizzes with PowerPoint," uploaded on Apr. 21, 2010, YouTube, available at: https://www.youtube.com/watch?v=Ussul0mY6RI.*
TechSupp247, "Insert Objects Into Microsoft Word 2010," uploaded on Mar. 29, 2011, YouTube, available at: https://www.youtube.com/watch?v=4IfD0idfEf4.*
"Microsoft Word," WebAIM: Web Accessibility in Mind, as published on Aug. 2, 2011 at http://webaim.org/techniques/word (via Wayback Machine), pp. 1-10.*
"How to Convert Your PowerPoint Presentation into an Elearning Course," published on Jan. 28, 2009, The Rapid E-Learning Blog, available at http://blogs.articulate.com/rapid-elearning/how-to-convert-your-powerpoint-presentation-into-an-elearning-course/, pp. 1-6.*
International Search Report and Written Opinion for International Patent Application No. PCT/US2012/051469, filed Aug. 17, 2012, received Feb. 20, 2013. 23 pages.
Lee et al. "Interactive E-Book Contents Authoring System Based on MPEF-4 LASeR." 13$^{th}$ International Conference on Advanced Communication Technology (ICACT) 2011. IEEE. Published Feb. 12, 2011. 4 pages.
Murray et al. "Microsoft Office Word 2007, Inside Out." Microsoft Press. Redmond, WA, US. 2007. pp. 420-425.
Dasgupta, Sayamindu. "Interactive Ebooks—Experiments on the OLPC X0-1 Book-Reading System." Designing for Children—With Focus on 'Play + Learn'. Published Nov. 19, 2009. Retrieved Nov. 21, 2012. Retrieved from the Internet: URL<http://www.designingforchildren.net/papers/s-dasgupta-designingforchildren.pdf>. 9 pages.
Meyen et al. "The Development and Validation of a Modular E-Book Authoring System." Proceedings of the Ninth Iasted International Conference Computers and Advanced Technology in Education. Lima, Peru. Published Oct. 6, 2006. pp. 94-99.
European Office Action for Application No. 12753633.2 dated Oct. 4, 2016, 6 pages.
Anonymous: "RapidSVG(TM) v2.0 Professional Technical Brief", WebArchive PDF, Oct. 23, 2005 (Oct. 23, 2005), pp. 1-23, XP055528856, Retrieved from the Internet: URL: http://web.archive.org/web/20051023171700if_/http://www.xstreamsoftware.com:SO/Download/RapidSVGv2.0Professional_TechBrief.pdf [retrieved on Nov. 30, 2018].
European Summons to Attend Oral Proceedings Pursuant to Rule 115(1) EPC, in European Application No. 12753633.2, dated 12, 14, 2018, 8 pages.
International Preliminary Report on Patentability in International Application No. PCT/US2012/051469, dated Mar. 6, 2014, 16 pages.
Invitation to Pay Additional Fees in International Application No. PCT/US2012/051469, dated Dec. 11, 2012, 9 pages.
Jokela et al., "Mobile multimedia presentation editor", The 26TH Annual Chi Conference on Human Factors in Computing Systems, Chi 2008 : Conference Proceedings; Apr. 5-10, 2008 in Florence, Italy, ACM, New York, NY, USA, Apr. 6, 2008 (Apr. 6, 2008), pp. 63-72, XP058345305, DOI: 10.1145/1357054.1357066 ISBN: 978-1-60558-011-1.

* cited by examiner

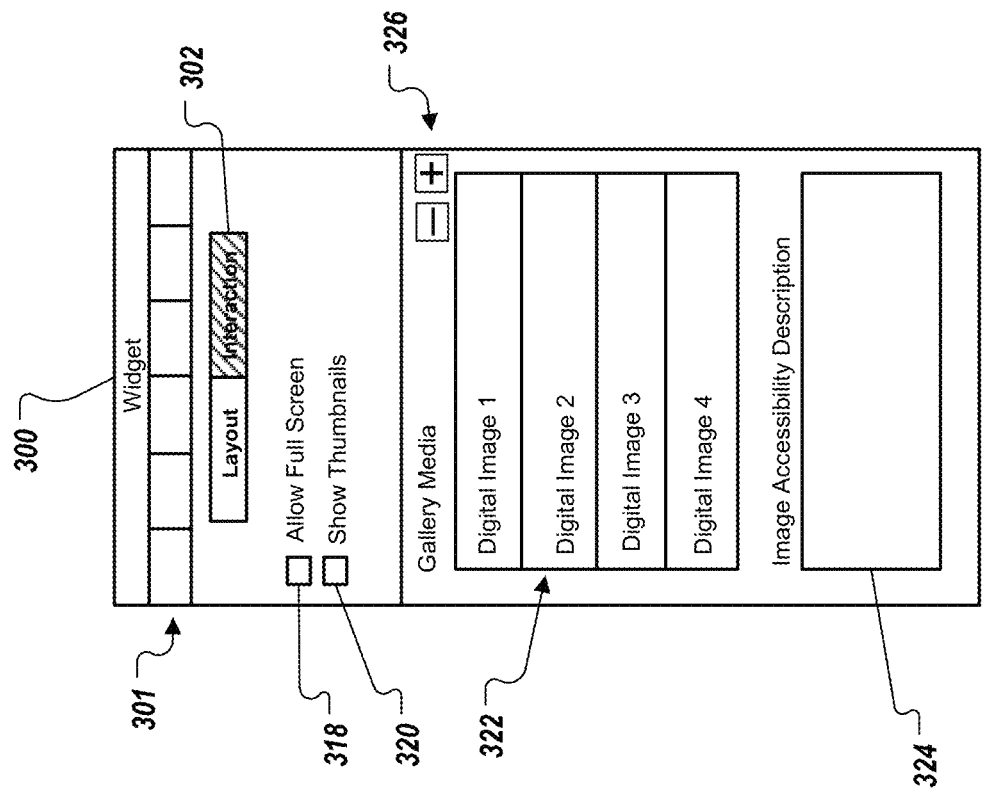
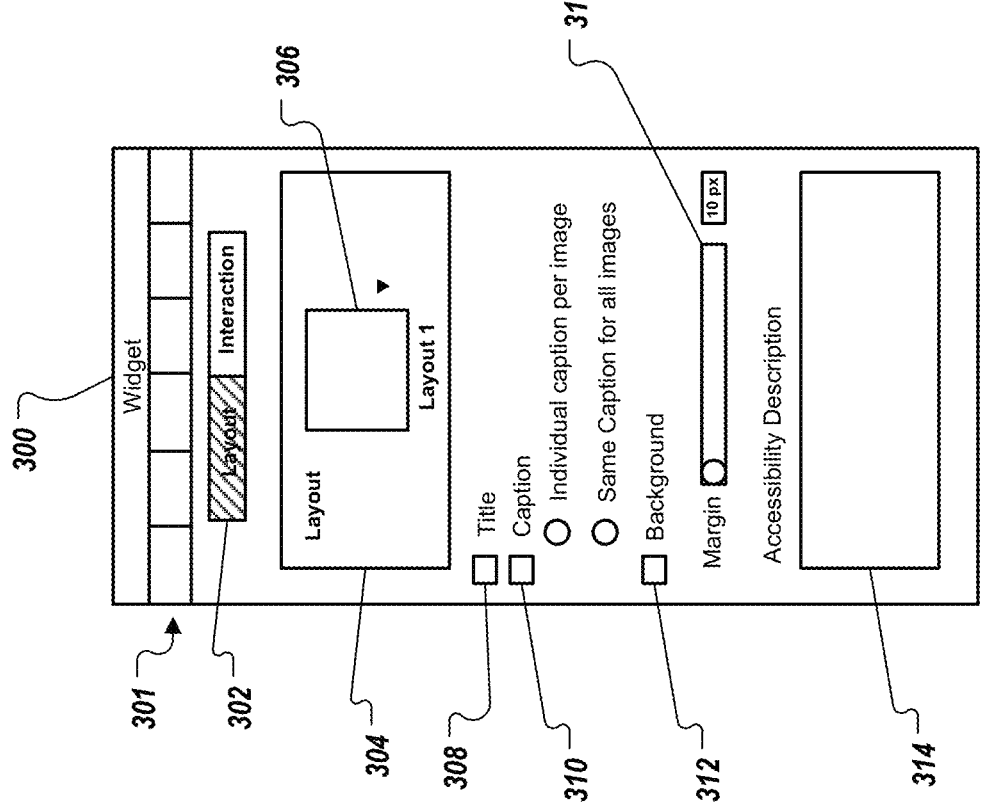

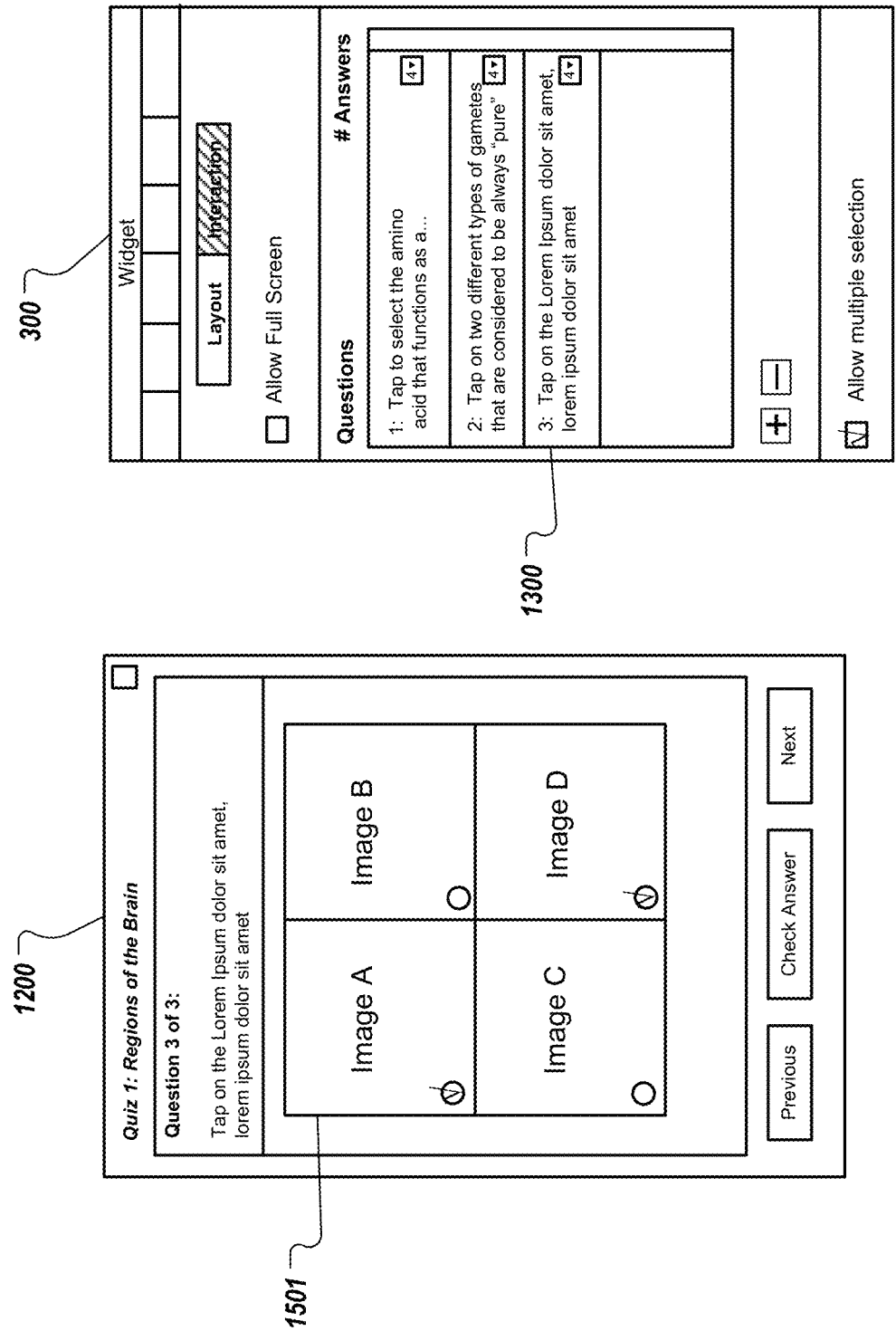

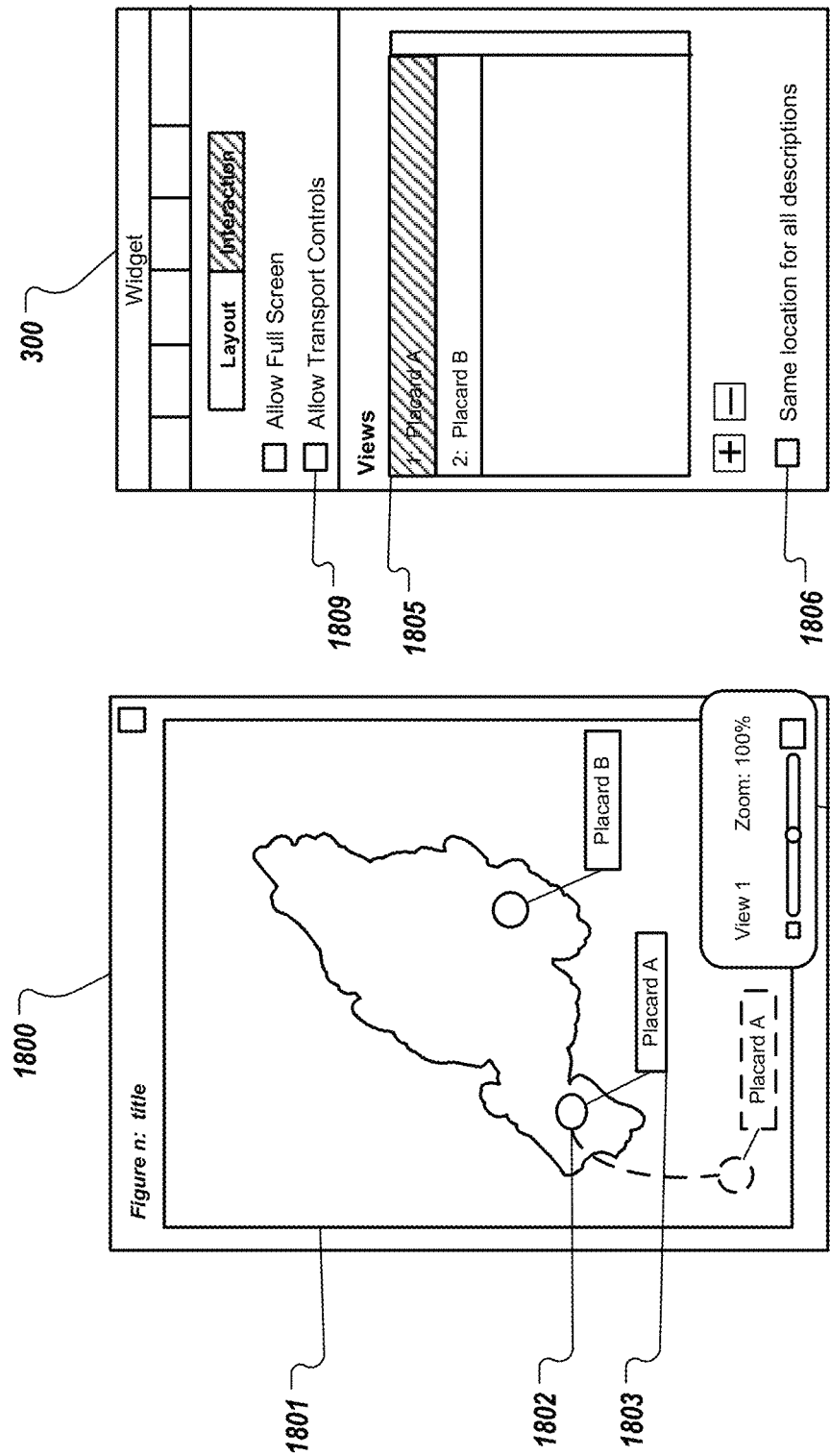

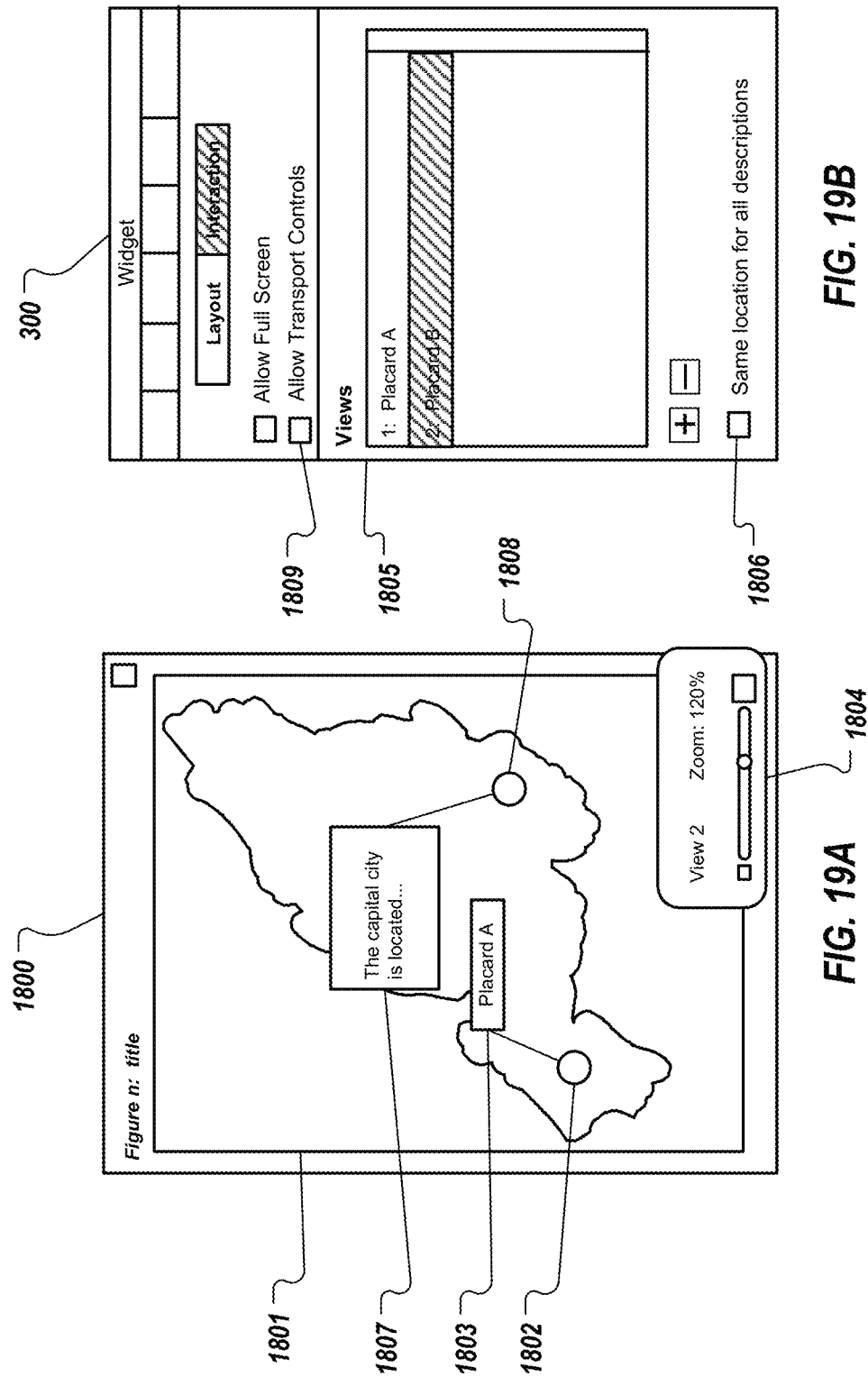

```
┌─────────────────────────────────────────────────────────────────┐
│ Displaying Hybrid Glossary/Index Page For Interacting With      │
│ Glossary/Index of Digital Book, the Glossary/Index Page         │
│ Including First Area Displaying Definition of First Glossary    │
│ Term, Second Area Displaying List of Glossary Terms,            │
│ Including First Glossary Term and Other Glossary Terms, Third   │
│ Area Displaying Glossary Terms Related to the First Glossary    │
│ Term and Fourth Area Displaying References To First Glossary    │
│ Term                                                             │
│                                                           2826   │
└─────────────────────────────────────────────────────────────────┘
                                  │
                                  ▼
┌─────────────────────────────────────────────────────────────────┐
│ Responsive to Dragging Secondary Term From List In Second Area  │
│ to Third Area, Automatically Relating Second Glossary Term To   │
│ First Glossary Term                                              │
│                                                           2827   │
└─────────────────────────────────────────────────────────────────┘
```

*FIG. 28D*

AUTHORING CONTENT FOR DIGITAL BOOKS

CROSS-REFERENCE TO RELATED APPLICATION

This application claims priority to U.S. Provisional Application No. 61/525,695, filed on Aug. 19, 2011, and U.S. Provisional Application No. 61/588,562, filed Jan. 19, 2012. The disclosures of the prior applications are considered part of and are incorporated by reference in the disclosure of this application.

TECHNICAL FIELD

This disclosure is related generally to authoring content for digital books.

BACKGROUND

Digital books (also called e-books) can be stored on and read from a digital device such as an e-book reader, tablet computer, laptop computer or smart phone. A digital book can be purchased from an online store on the World Wide Web and downloaded to the device. The device can include buttons for scrolling through pages of the digital book.

Creating a digital book can include various tasks such as composing, composition, proofing, editing, illustration generation, page layout, table of contents (TOC) generation, glossary generation, indexing, bibliography generation, and publishing. Software tools for creating digital books can help to automate many of these tasks. Because digital book authors may not be computer experts, such software tools need to be intuitive and easy to use.

SUMMARY

This disclosure describes systems, methods, and computer program products for authoring content for digital books. In some implementations, a single graphical user interface (GUI) is presented that allows an author to design a layout for the digital book, including editing text and inserting various types of interactive elements in the text. The GUI functions as both a digital book layout design tool and a word processor to facilitate the building of a digital book. The relative page location of inserted widgets can be determined by a user-selectable anchor point placed within the text. An outline view of the digital book can be created and presented in the GUI based on a hierarchical structure determined by paragraph styles applied to the text. The GUI can provide a hybrid glossary and index page for allowing the author to create and manage a glossary and index for the digital book.

In some implementations, a user interface element (hereafter also referred to as a "widget inspector") can be presented in the GUI to allow the author to determine a layout and user interaction of a widget when presented on a device. Layout and user interaction options can include but are not limited to the selection of title and caption settings and the displaying or hiding of controls for resizing, zooming and navigating widget content. Widget content can include but is not limited to text, image galleries, multimedia presentations, movies, HTML, animated and static diagrams, charts, tables, visual dictionaries, three-dimensional (3D) animation and any other media content.

In some implementations, the author can add accessibility descriptions to labels or captions of a widget so as to cause a text-to-speech engine of an e-book reader operating in an accessibility mode (e.g., "voiceover" mode) to play back audio corresponding to the label or caption. The accessibility descriptions provide assistance to visually impaired users of the e-book reader.

In some implementations, a method of authoring content for a digital book can include: receiving text from a text source; displaying the text in a graphical user interface (GUI); receiving first input selecting a widget type to be inserted in the text in the GUI; responsive to the first input, inserting a widget of the widget type in the text according to an anchor position in the text selected by the user; receiving second input selecting content to be inserted into the widget; and responsive to the second input, inserting content in the widget.

In some implementations, a method of authoring content for a digital book includes: receiving text from a text source; displaying the text in a graphical user interface (GUI); receiving first input selecting a review widget type to be inserted in the text in the GUI; and responsive to the first input, inserting a review widget in the text, the review widget including a question area for receiving a question and an answer area for receiving one or more answers to the question, where the answer area is configured according to a question type.

In some implementations, a method of authoring content for a digital book includes: receiving text from a text source; displaying the text in a graphical user interface (GUI); receiving first input selecting a visual dictionary widget type to be inserted in the text in the GUI; and responsive to the first input, inserting a visual dictionary widget in the text, the visual dictionary widget including a media display area for receiving content and a label area for supplying one or more placards configured to be dragged to one or more locations on the content.

In some implementations, a method of authoring content for a digital book includes: displaying a hybrid glossary and index page for interacting with a glossary and index of a digital book, the glossary and index page including a first area displaying a definition of a first glossary term, a second area displaying a list of glossary terms including the first glossary term and other glossary terms, a third area displaying related glossary terms and a fourth area displaying references to the first glossary term; and responsive to dragging a second glossary term from the list in the second area to the third area, automatically relating the second glossary term to the first glossary term.

Other implementations are also possible including but not limited to implementations directed to systems, devices, and computer-readable mediums.

Particular implementations disclosed herein provide one or more of the following advantages. An authoring tool for digital books is disclosed that provides authors with a single GUI that allows the author to design a layout for the digital book, including editing text and inserting various types of interactive elements in the text. The GUI functions as both a digital book layout design tool and a word processor to facilitate the building of a digital book. The GUI and interactive elements are simple and intuitive to use, making the digital book creation process easier and enjoyable to the author. The disclosed GUIs facilitate or accelerate data input, give the author better control over the design of the book and provide better visual feedback to the author.

The details of the disclosed implementations are set forth in the accompanying drawings and the description below. Other features, objects, and advantages will be apparent from the description and drawings, and from the claims.

DESCRIPTION OF DRAWINGS

FIGS. 3A and 3B illustrate an exemplary widget inspector for the gallery widget of FIG. 2

FIGS. 15A and 15B illustrate another exemplary multiple choice question type and corresponding widget inspector.

FIGS. 18A and 18B illustrate an exemplary visual dictionary widget and corresponding widget inspector, where a HUD is used to set a first zoom level for a first placard.

FIGS. 19A and 19B illustrate an exemplary visual dictionary widget and corresponding widget inspector, where the HUD is used to set a second zoom level for a second placard.

FIG. 24 illustrates an exemplary hybrid glossary/index page with added term reference.

FIGS. 28A-28D are flow diagrams of exemplary processes for creating a digital book.

The same reference symbol used in various drawings indicates like elements.

DETAILED DESCRIPTION

In the text that follows, the term "author" refers to a user of a digital book authoring application and the terms "user" or "student" refer to a user of an e-book reader.

Exemplary GUI for Authoring Content for Digital Books

Figure 1:
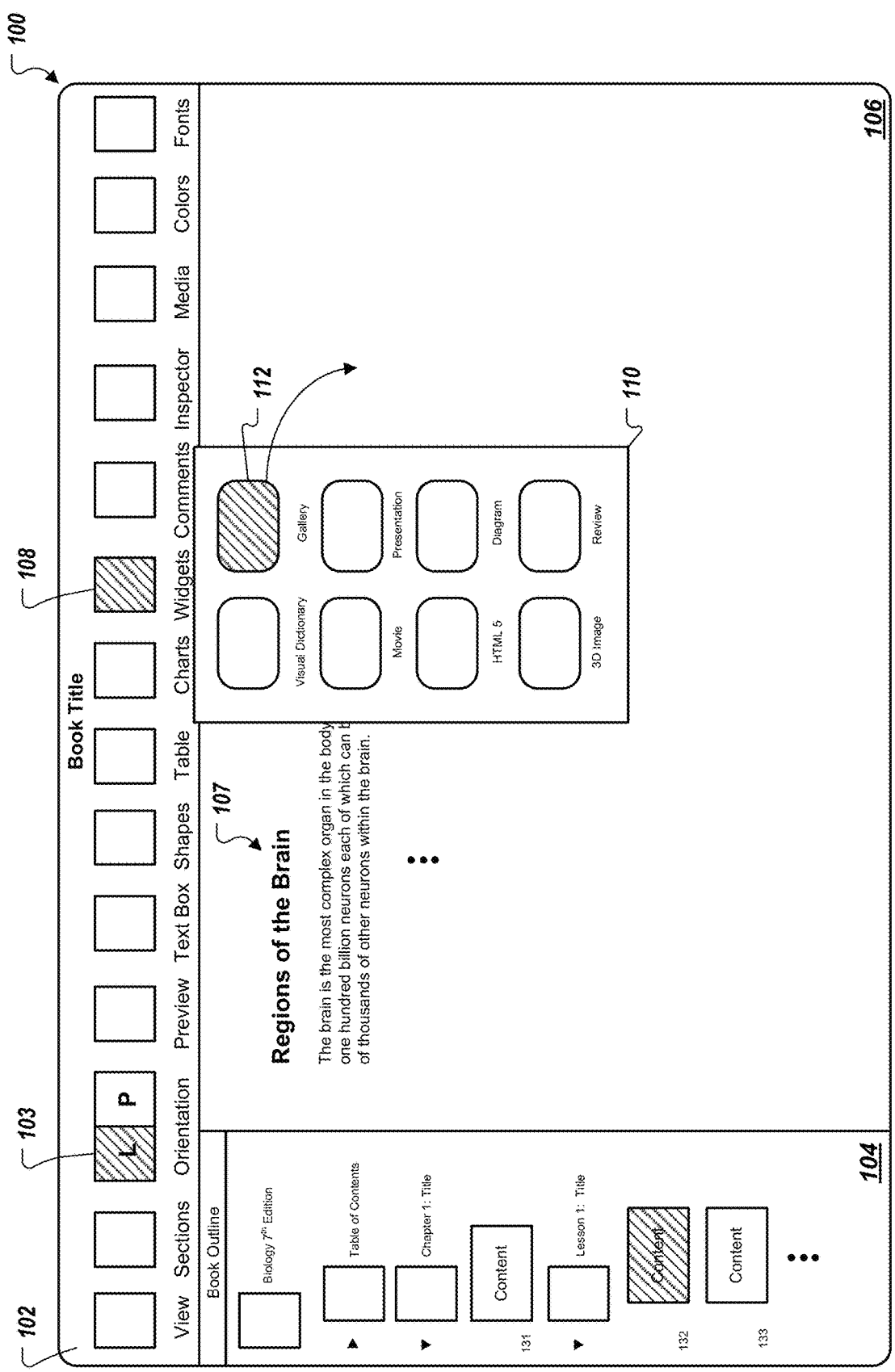
FIG. 1 illustrates an exemplary GUI for authoring content for digital books.

FIG. 1 illustrates an exemplary graphical user interface (GUI) 100 for authoring content for digital books. GUI 100 can be generated by a computer program (e.g., digital book authoring application) executing on one or more processors or processing cores of a data processing apparatus (e.g., device architecture 2900, FIG. 29), including but not limited to: laptop computers, desktop computers, tablet computers, e-book readers and smart phones. In some implementations, GUI 100 can be a Web page generated by a Web-based digital book authoring application hosted on a server computer and sent to a client device over a network (e.g., the Internet).

In some implementations, the data processing apparatus (also referred to as "device") can include a touch-sensitive surface. The touch-sensitive surface can process multiple simultaneous points of input, including processing data related to the pressure, degree or position of each point of input. Such processing facilitates gestures with multiple fingers, including pinching and swiping. The examples that follow assume that the device hosting the digital book authoring application includes a touch-sensitive surface for displaying GUI 100 and for receiving touch input.

In some implementations, GUI 100 can be generated from a digital book template that the author can select from a template chooser when the authoring application is first launched on the device. In the example shown, a template for a textbook was selected by the author, and text from the selected textbook template file was loaded into the authoring application. A template can also have several master layouts for pages. For example, there can be separate master layouts for title page, TOC page and basic pages. The author can change the master layout of a given page to adopt the fonts and paragraph styles of that master layout.

In some implementations, GUI 100 can include toolbar 102, sidebar 104 and composition area 106. Toolbar 102 includes icons that can be selected by an author to perform various tasks associated with creating a digital book. In the example shown, icons include View, Sections, Orientation, Device Preview, Text Box, Shapes, Table, Charts, Widgets, Comment, Inspector, Media, Colors and Fonts.

Sidebar 104 can display various views depending on the view selected via the View icon. In the example shown, a book outline view is displayed.

Composition area 106 is the work area (a virtual composition area) for the author to insert text and add interactive elements (e.g., a widget) for presenting rich media and graphics, as described below. The author can enter text directly onto composition area 106 using a virtual keyboard that is exposed when a text editing option is selected through a menu, icon or tap sequence.

Text and other content can be imported into the authoring application in a variety of ways. For example, a text file can be imported into the application in response to selection of a menu import command. A content file can also be dragged from desktop, folder, disk or other source and dropped into GUI 100. In some implementations, when text is imported into the authoring application, one or more pages are automatically generated to accommodate the text. The number of pages created depends on the original size of the text file. Text can also be entered (e.g., typed in by the author) directly onto composition area 106 by the author. Thus, the authoring application can operate as both a layout design tool and a word processor. When text is imported in the digital book, the text automatically adopts the fonts and paragraph styles of the layout, which in this example can be determined by the textbook template.

In some implementations, the author can change the layout or formatting style of a digital book by directly editing an element of the digital book. For example, the author can select a heading, paragraph, page, or other element of the digital book. The author can provide input to change the size, color, font or other attribute of the selected element. When the author manually or directly (e.g., without actually selecting a different predefined style or format) changes the attribute of an element in this manner, the change can be automatically applied to similar types of elements throughout the digital book. For example, if the author changes the font size of a heading to twenty, the font size of other headings of the same type (e.g., chapter headings, section headings, figure headings, media heading, etc.) throughout the digital book can be automatically changed to twenty. If the author changes the font type of a figure label, other figure labels throughout the digital book can be automatically changed to be consistent with the changed font type, for example. Thus, style and format changes can be automatically applied to different types of elements of a digital book based on element type.

In some implementations, the author can automatically generate a new paragraph style by directly editing an element of the digital book. For example, headers, figure descriptions, image captions, and text that make up the body of the digital book can all have paragraph styles. In some implementations, the author can select and edit an element to create a new paragraph style for similar types elements. For example, all section headers within the digital book can have a common paragraph style. If the author selects and edits one section header (e.g., changes font type, font size, font color, etc.) a new section header paragraph style can be automatically generated based on the attributes of the edited section header. The newly generated section header paragraph style can then be automatically applied to other section headers throughout the digital book.

In some implementations, changes can be automatically applied to other elements based on the paragraph style of the elements. For example, different types of digital book elements can have the same paragraph style. If the author changes the paragraph style of one of the digital book elements (e.g., by directly editing the element), the style changes can be automatically applied to other elements that have the same paragraph style. For example, if figure labels and body text of the digital book have the same paragraph style and the author changes the font of a figure label, the font change can be automatically applied to the other figure labels and the body text of the digital book even though the figure labels and body text are different types of digital book elements. Thus, style and format changes can be automatically applied to different types of elements of a digital book based on a shared or common paragraph style.

In some implementations, previous changes made to an element will be preserved. If the author has previously manually or directly changed an attribute of an element, the previously changed element will not be automatically changed based on a change made to a similar element. For example, if the author has previously manually or directly changed the font color of the "Chapter 4" heading to blue, a subsequent change to the font color of the "Chapter 1" heading will not cause an automatic change in font color of the "Chapter 4" heading.

The book outline view shown in sidebar 104 is a hierarchical structure of thumbnail images and icons (collectively, "nodes") that can be touched or clicked by the author to navigate the digital book. Each "node" represents a part of the digital book, such as title page, media introduction (e.g., for branding), a table of contents (TOC), and the beginning page of chapters, lessons and topics. In the example shown, the template is a textbook template. The textbook template can include a TOC and a number of chapters. In some implementations, each chapter can include a number of lessons and each lesson can include a number of topics. A hybrid glossary and index (not shown) can also be included as a node in the structure. In the example shown, page 132 of the digital book is the page that is currently displayed on composition area 106 as indicated by the highlighted corresponding thumbnail image in sidebar 104.

In some implementations, the hierarchical structure in sidebar 104 is automatically determined based on paragraph styles that have been applied to the text. For example, a predefined or custom paragraph style can be applied to text header 107 to indicate that the header is the start of a "topic." The page of the digital book containing header 107 (page 132) is automatically converted into a thumbnail image and placed at the appropriate location in the hierarchical structure. By using paragraphs styles as a differentiator, the outline of the digital book can be created automatically from a text source (e.g., a book manuscript).

Toolbar 102 includes Orientation icon 103 which can be toggled by the author to display GUI 100 in landscape or portrait orientation, so that the author can determine how the digital book will look and function in both portrait and landscape orientations when presented on an e-book reader. In some implementations, landscape orientation is a preferred default orientation for performing layout and editing tasks in the authoring application.

Toolbar 102 includes various other icons, including a Preview Device icon for previewing authored content on various devices and icons for adding text boxes, shapes, tables, charts, media and comments to the digital book. Toolbar 102 also includes icons for invoking interactive elements (e.g., widgets) and corresponding widget inspectors for customizing the layout and user interactions of the widgets. For example, when widget icon 108 in toolbar 102 is selected by the author a menu of widget options is displayed in GUI 100. The author can drag and drop thumbnail image 112 corresponding to a "gallery" widget 110 onto composition area 106 to add a "gallery" widget 110 to the digital book, as described in more detail in reference to FIG. 2.

Other widgets types can include but are not limited to a visual dictionary widget, a movie widget, an HTML widget, a 3D animation widget, a presentation widget, a diagram widget and a review widget (e.g., quiz widget).

One type of interactive element is referred to herein as a "widget." As used herein, a "widget" is a container for presenting rich media and graphical content, such as digital images, movies, animated diagrams and graphs and slide presentations. A "container" is a class whose instances are collections of other objects, and can be used to store objects in an organized way following specific access rules. The layout and user interactions for a given widget can be set by the author through a corresponding widget inspector, as described in reference to FIGS. 3A and 3B.

The interactive elements described below can have one or more of titles, labels, captions and accessibility descriptions. The title, label, caption or accessibility description becomes a signifier to the authoring application that the content referenced by these items is an illustration in the digital book. Thus, in an e-book reader, the user can search for terms and receive a search result with two result sets: one for text and one for media objects. A search engine in the authoring application will search the text in titles, labels, captions, accessibility descriptions and metadata of media objects when generating search results.

Exemplary Gallery Widget

Figure 2:
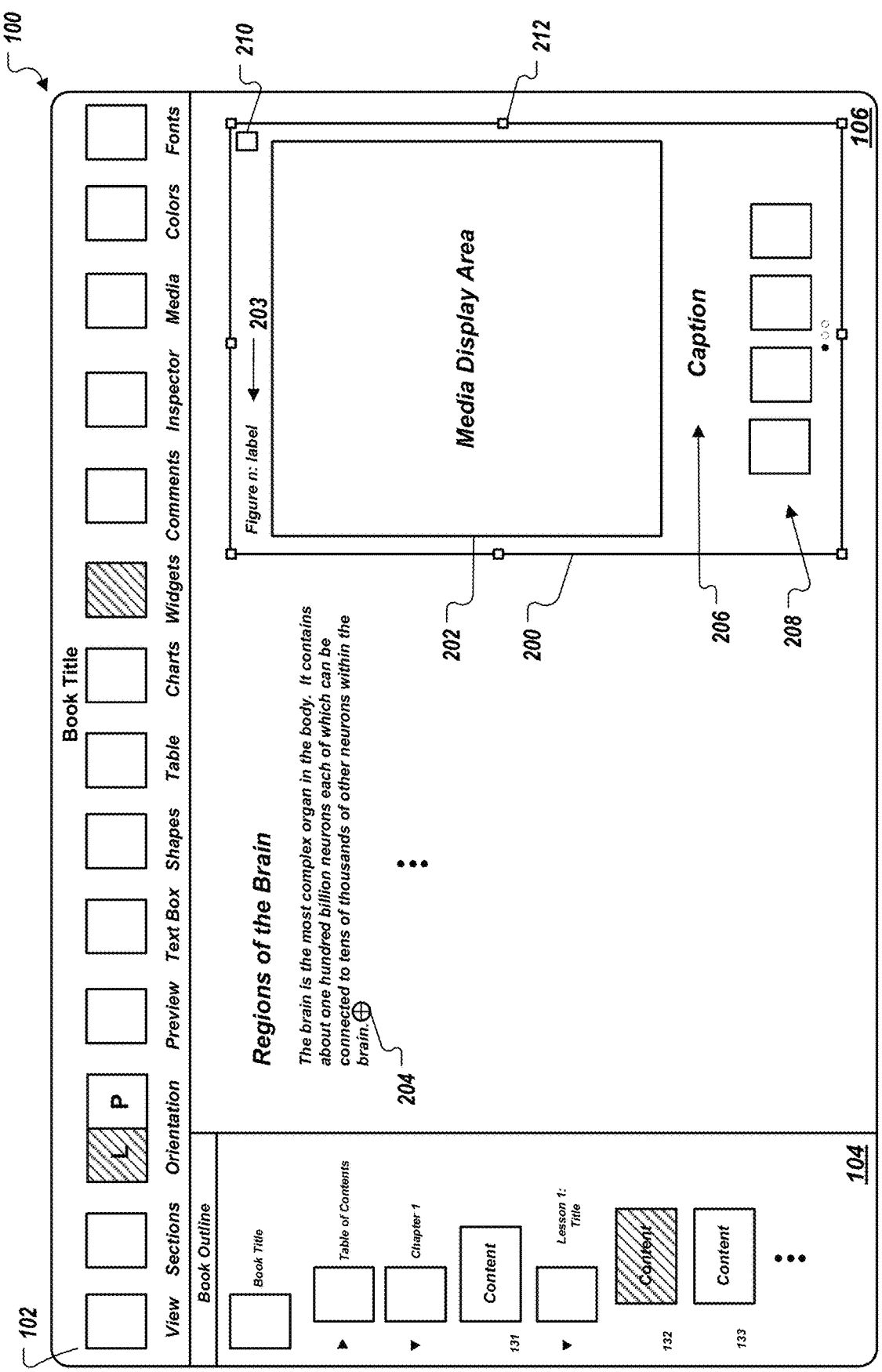
FIG. 2 illustrates an exemplary gallery widget for inserting a gallery of digital images in a digital book.

FIG. 2 illustrates an exemplary gallery widget 200 for inserting a gallery of digital images in the digital book. In some implementations, gallery widget 200 can be added to the digital book by dragging thumbnail image 112 from a menu onto composition area 106, as shown FIG. 1. Gallery widget 200 can includes handles 212 to allow the author to resize the widget manually on the book page.

Gallery widget 200 is associated with anchor 204, which can be selected and dragged to a desired location on composition area 106 by the author. In this example, the author has placed anchor 204 after the word "brain" in the currently displayed text of page 132. Anchor 204 is used to maintain a page relative location for gallery widget 200 so that gallery widget 200 will always be displayed on the same page and page location as its corresponding anchor 204. If the author adds additional content to the current page such that anchor point 204 flows into the next page of the digital book, gallery widget 200 will move to the next page at the location identified by the position of anchor 204. Although anchor 204 is inserted within the text, the anchored object (e.g., media, widget) can be placed anywhere on the page (including where there is no text) and text flows around the object as needed.

In some implementations, Gallery widget 200 can include various components including figure label (with enumeration) 203, media display area 202, caption area 206, thumbnail track 208 and full screen button 210.

Figure label 203 can be edited directly by the author by tapping or clicking label 203. Figure label 203 is also enumerated. The enumeration automatically updates (e.g., renumbers sequentially) based on the location of the widget relative to other widgets of the same widget type in the digital book. References to the widget in the text will also be automatically updated. This feature eliminates the need for the author to update manually figure labels each time the order of the figures is changed.

Media display area 202 is the portion of gallery widget 200 that displays media such as digital images. The author can perform a tap-slide gesture to the left or right in area 202 to move to the previous or next image in the gallery. The author can also pinch and drag the image in media display area 202 to zoom and pan the image when in full screen view, which can be invoked by full screen button 210. In full screen view, the media displayed in media display area 202 consumes a larger portion of GUI 100. Full screen button 210 can be a tap button that the author taps to enter and exit full screen view.

Caption area 206 of gallery widget 200 is where the author can add manually caption text for the media displayed in media display area 202.

Thumbnail track 208 is a navigation control that allows the author to navigate directly to a specific image in the gallery by a single tap on a thumbnail. The thumbnails can be centered horizontally on the screen. In some implementations, thumbnail track 208 allows for various modes of navigation. In a first navigation mode, the author can drag the thumbnail track to move to the next/previous page of thumbnails. In a second navigation mode, navigation dots can be included on thumbnail track 208. The second mode is useful when thumbnail track 208 has more thumbnail images than can fit on the width of the frame. The author can tap on the navigation dot area to move from page to page. In a third navigation mode, the navigation dots are replaced by a "current image" of "total number of images" format. The third mode is useful when the number of navigation dots exceed a predetermined number (e.g., 10).

FIGS. 3A and 3B illustrate an exemplary widget inspector 300 for gallery widget 200 of FIG. 2. Widget inspector 300 can be invoked when the author selects the Inspector icon from toolbar 102. In some implementations, widget inspector 300 is a user interface element that "floats" on GUI 300 and can be dragged by the user to any desired location in GUI 300.

Widget inspector 300 provides various options for customizing gallery widget 200. In some implementations, widget inspector 300 has two modes: layout mode and user interaction mode. FIG. 3A illustrates an exemplary layout mode and FIG. 3B illustrates an exemplary user interaction mode. For both modes, the top portion of widget inspector 300 includes toolbar 301 that can include icons for invoking tools for editing the layout of gallery widget 200, including tools for adding text, charts, tables, colors, fonts, etc. Both modes also include toggle button 302 for toggling between layout mode and interaction mode.

Referring to FIG. 3A, under toggle button 302 is layout menu 304 where the author can choose between various predefined layout prototypes 306 for gallery widget 200. Located beneath layout menu 304 is title and caption settings 308, 310 for allowing the author to customize the way title and captions are displayed by widget 200. There is a setting option for "individual caption per image" and an option for "same caption for all the images." Located beneath settings 308, 310 is background button 312 for choosing to show/hide the widget's background frame. The author can also manipulate slider control 316 to choose an outer margin distance.

Located beneath slider control 316 is accessibility description area 314 to allow the author to add a description manually for vision-impaired users of the digital book. When a visually impaired user selects an accessibility mode (e.g., "voiceover" mode) on an e-book reader, the accessibility description can be read aloud by a text-to-speech engine in the e-book reader.

Referring to FIG. 3B, button 318 allows the author to choose whether to let a user of the e-book reader view content in full screen. Thumbnail button 320 allows the author to hide or display thumbnails in thumbnail track 208. When hidden, the thumbnails can be replaced with navigation dots. If there are more than n dots (e.g., 10), image numbers can be displayed instead of the navigation dots (e.g., 1 of 21).

Gallery media file list 322 displays all the files added to gallery widget 200. The image currently being displayed in media display area 202 can be highlighted with a colored background (e.g., blue background).

The "+" and "−" icons 326 can be used by the author to insert media into gallery widget 200. When pressed, a media browser can be displayed (not shown) to allow the author to select a media file. When a media file is selected from media file list 322, the author can use the "−" icon to remove it from gallery widget 200.

Image accessibility description area 324 allows the author to add description for the selected media file in media file list 322. The description can be read aloud to a visually impaired user by a text-to-speech engine in the e-book reader when operated in an accessibility mode (e.g., "voiceover" mode).

Figure 4:
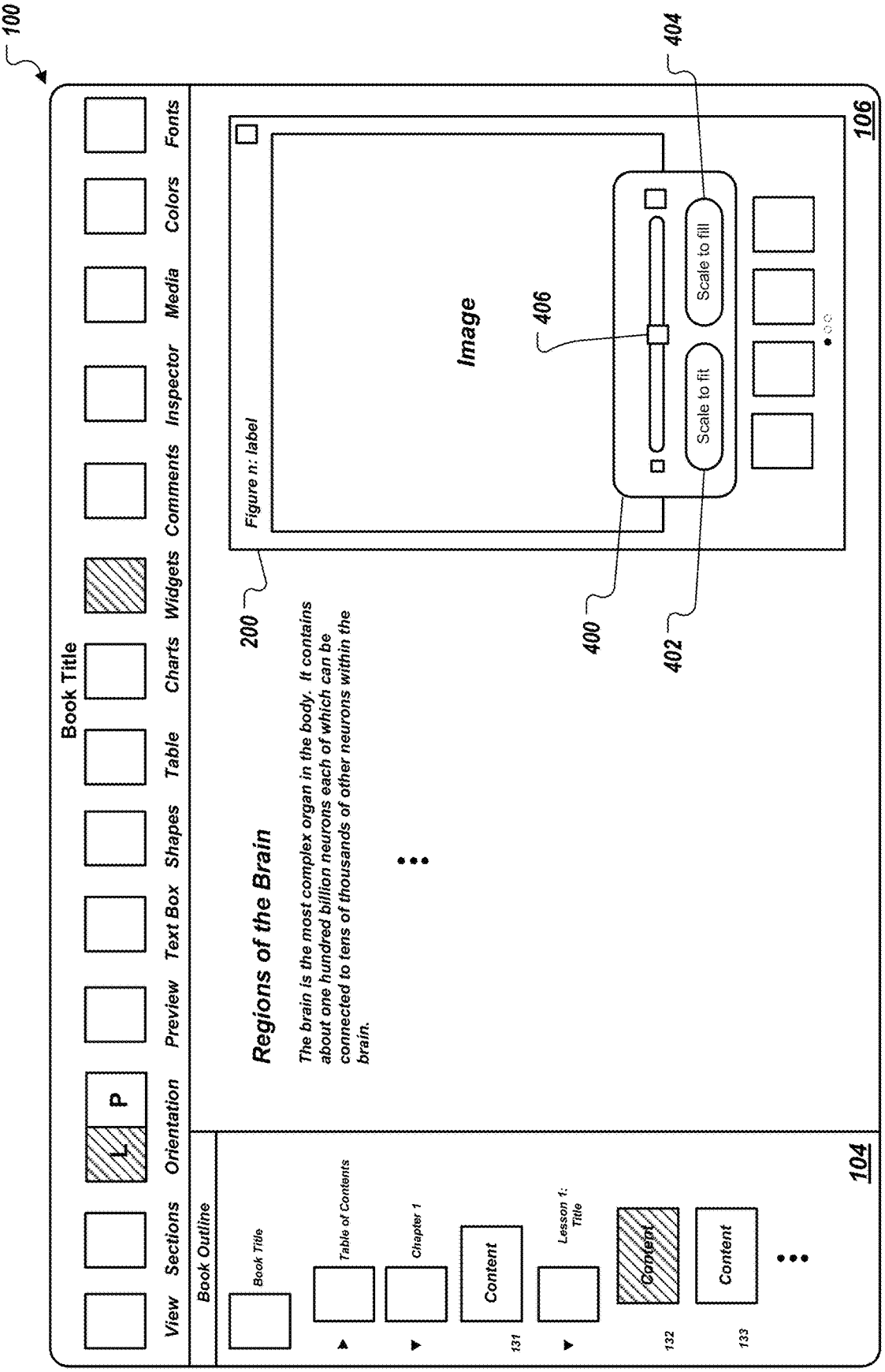
FIG. 4 illustrates an exemplary heads-up display (HUD) for resizing widget content.

FIG. 4 illustrates an exemplary HUD 400 for resizing media inserted in gallery widget 200. HUD 400 can include slider control 406 and "scale to fit" button 402 or "scale to fill" button 504. Depending on which button 402, 404 is selected, slider control 400 can be used by the author to resize the media to fit within media display area 202 or to fill media display area 202.

Exemplary Work Flow for Creating Widgets

Figure 5:
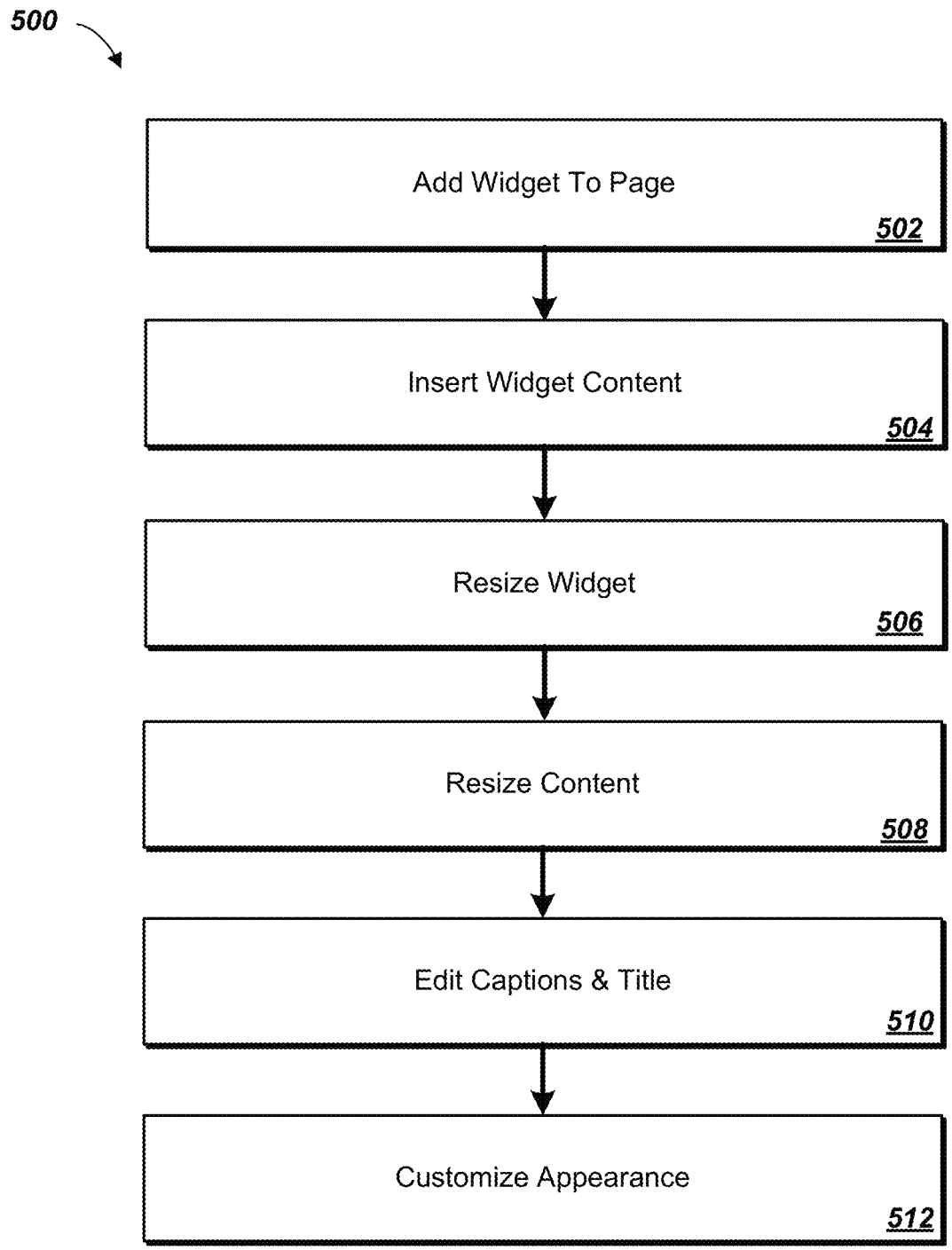
FIG. 5 is a flow diagram for an exemplary process of adding a customized widget to the digital book.

FIG. 5 is a flow diagram for an exemplary process 500 of adding a customized widget to a digital book (e.g., a customized gallery widget). Process 500 can begin when an author adds a widget to a page of a digital book (502). The widget can be added by dragging and dropping a widget icon onto a virtual composition area of a GUI of an authoring application, as described in reference to FIGS. 1 and 2.

Process 500 can continue by inserting widget content into the widget (504). The content can be selected for insertion from a media browser or by dragging and dropping media from a media source into a media display area of the widget, as described in reference to FIG. 2.

Process 500 can continue by resizing the widget (506). Resizing can be performed by the author manually using handles, as described in reference to FIG. 2.

Process 500 can continue by resizing content (508). The author can resize content using a resizing HUD, as described in reference to FIG. 4.

Process 500 can continue by editing the captions and title of the widget (510). The author can edit the captions and title by typing directly in the figure label and caption areas of the widget, as described in reference to FIGS. 2 and 3.

Process 500 can continue by customizing the appearance of the widget (512) using the corresponding widget inspector, as described in reference to FIGS. 3A, 3B.

Exemplary Conversion of Media Objects to Widgets

Figure 6:
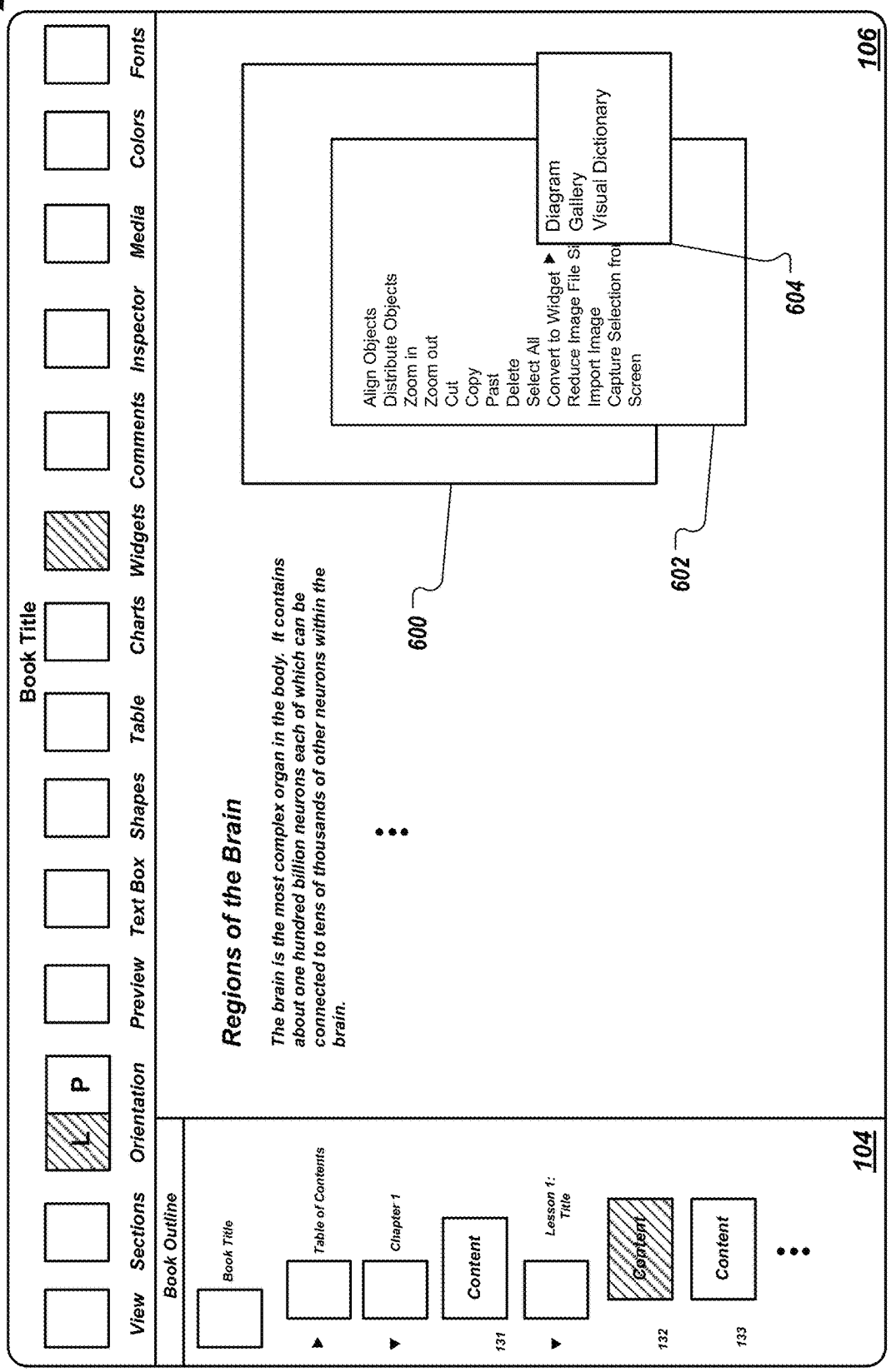
FIG. 6 illustrates an exemplary process for converting a media object into a widget.

FIG. 6 illustrates an exemplary process for converting a primitive (e.g., a media object) into a widget. In some implementations, an author can drag and drop a media object 600 from media source onto composition area 106. Media object 600 can have handles for allowing the author to resize media object 600. The author can automatically convert media object 600 into a widget by tapping (or clicking) media object 600 to invoke menu 602. An option in menu 602 can be selected to convert media object 600 into a widget. Selecting this option exposes submenu 604 listing widget types. The author can select a desired target widget type from submenu 604, and the authoring application automatically converts media object 600 into a widget of the selected target widget type. For example, the user could convert media object 600 to a gallery widget, and the media object would be an image in the gallery.

Figure 7:
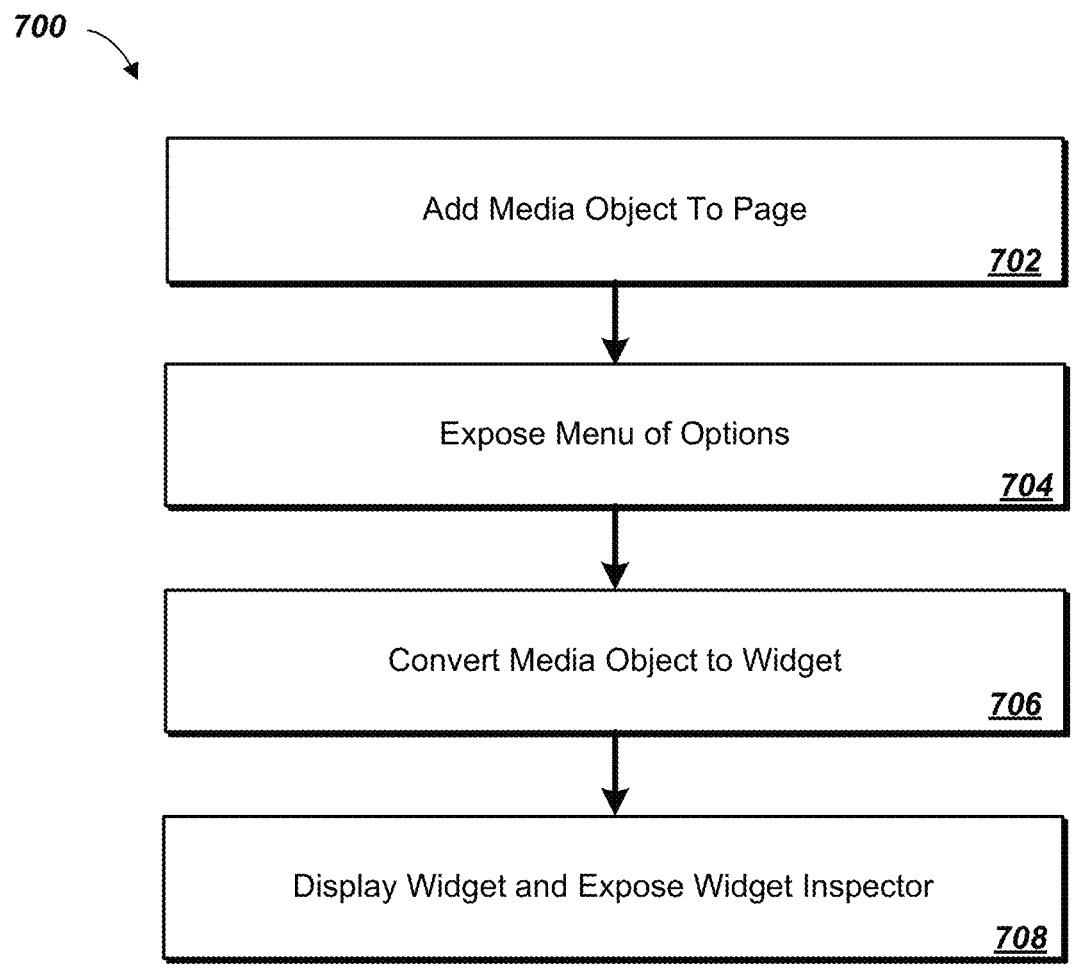
FIG. 7 is a flow diagram of an exemplary process for converting a media object into a widget.

FIG. 7 is a flow diagram of an exemplary process 700 for converting a media object (e.g., a digital image) into a widget. Process 700 can begin when an author adds an image to a page of a digital book (702). The image can be dragged and dropped from a desktop, media browser or other source and dropped onto the composition area 106 of GUI 100.

Process 700 can continue when the author exposes a menu of options (704) and selects an option to convert the media object into a widget. In some implementations, selecting this option exposes a submenu of widget types that can be selected by the author.

Process 700 automatically converts the media object to a widget of the selected widget type (706), displays the widget on the composition area and exposes a corresponding widget inspector (708). The media object is added to the widget. The widget inspector can be used by the author to adjust the layout and user interactions of the widget on an e-book reader, as described in reference to FIGS. 3A, 3B.

Exemplary Presentation Widget

Figure 8:
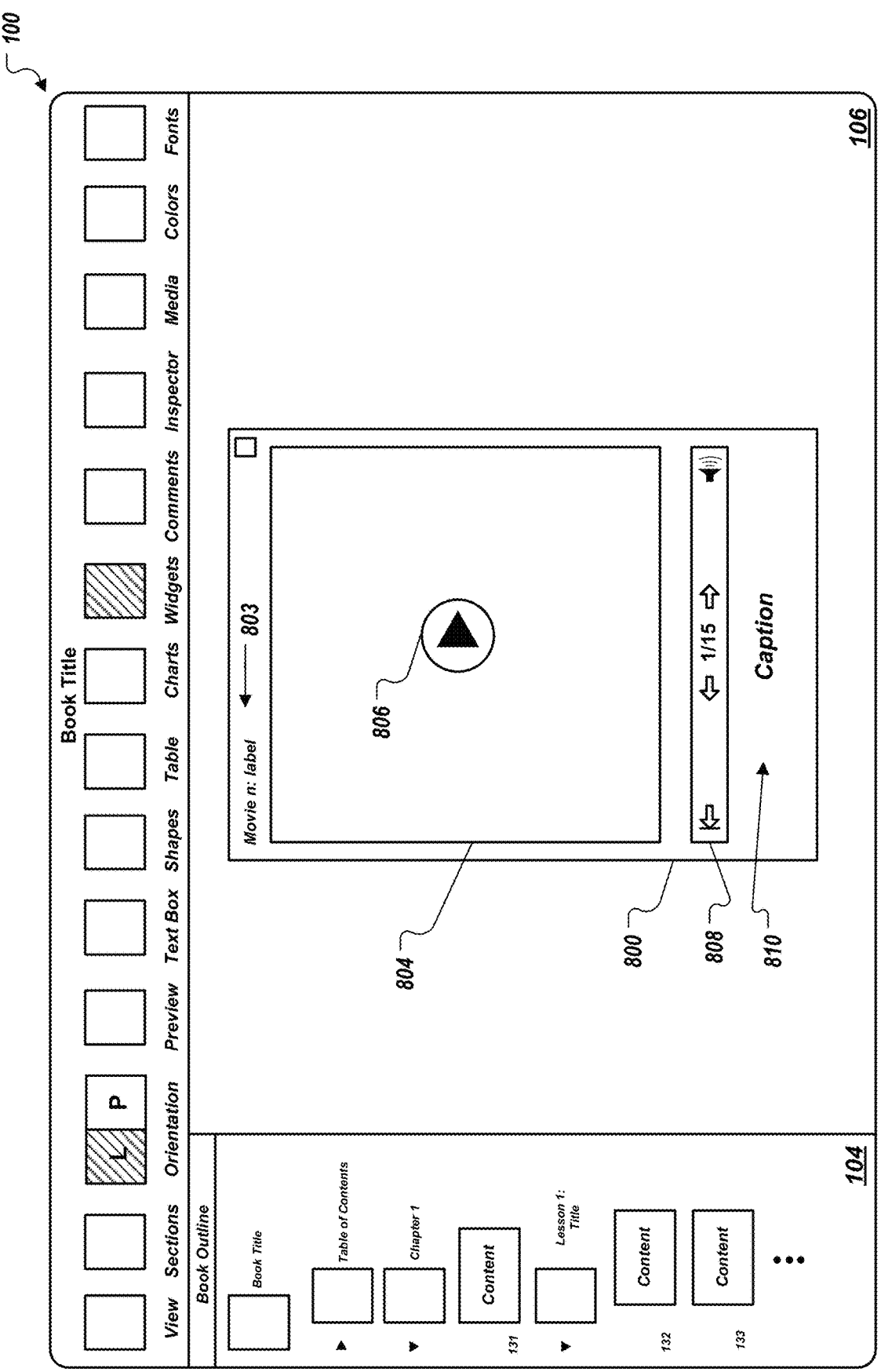
FIG. 8 illustrates an exemplary presentation widget for inserting a multimedia presentation in a digital book.

FIG. 8 illustrates an exemplary presentation widget 800 for inserting a multimedia presentation in a digital book. Presentation widget 800 can be added to the digital book by dragging and dropping its corresponding icon from menu 110 onto composition area 106 as described in reference to FIG. 1. The Media icon in toolbar 102 can be used to invoke a media browser to allow the author to select a multimedia presentation to add to presentation widget 800.

In some implementations, presentation widget 800 can include label 803, media display area 804, transport controls 808 and caption area 810. Label 803 includes enumeration that updates automatically as previously described in reference to FIG. 2. A full screen button is also available.

Figure 9:
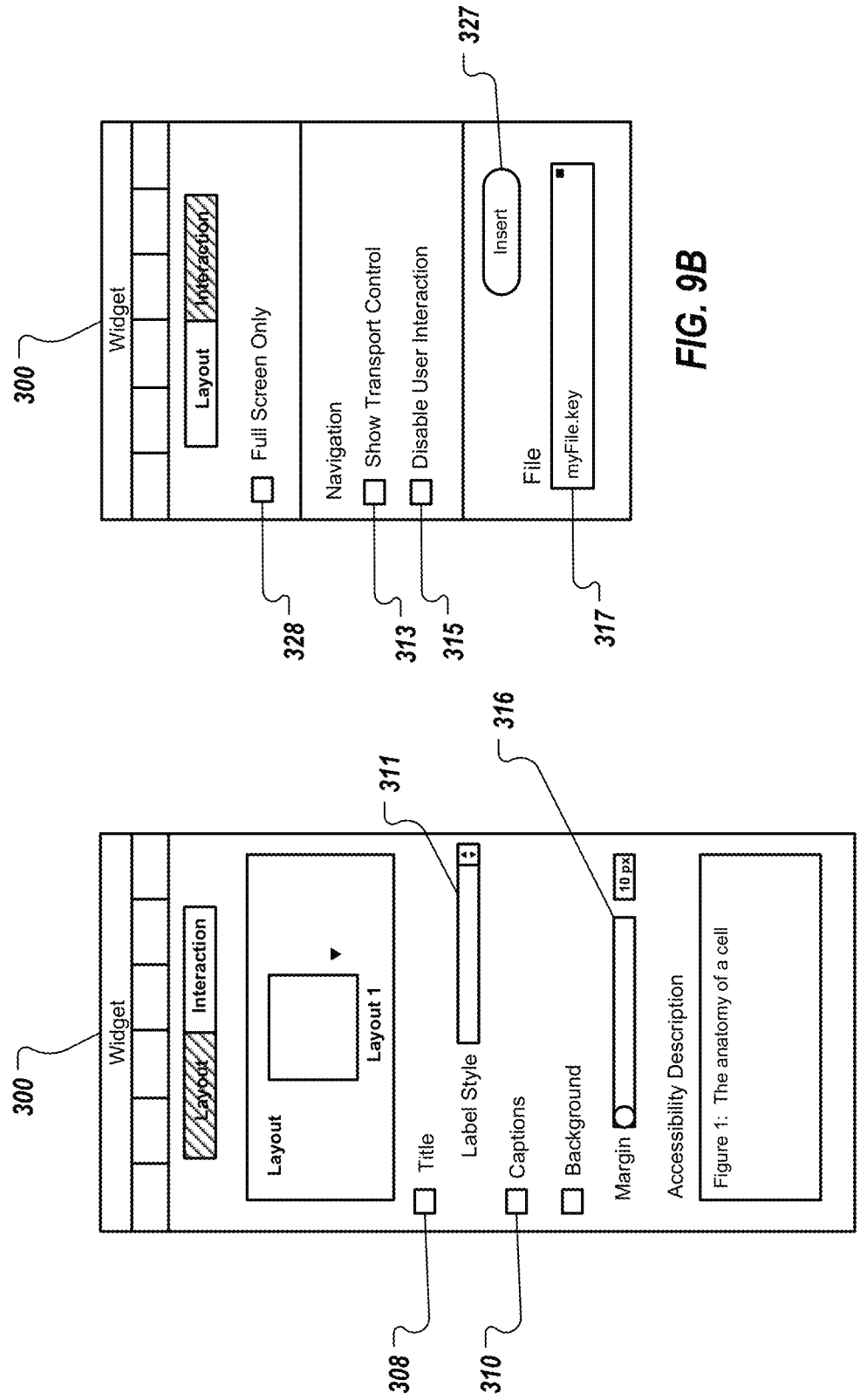
FIGS. 9A and 9B illustrate an exemplary widget inspector for the presentation widget.

The author can add a multimedia presentation to presentation widget 800 using corresponding widget inspector 300, as described in reference to FIG. 9B. alternatively, a multimedia presentation file can be dragged from a source (e.g., desktop, media browser) and dropped into media display area 804. The author can play the multimedia presentation by touching or clicking play button 806. Optional transport control 808 can be added to widget 808 to advance slides of the multimedia presentation and to adjust volume. Caption area 810 can be edited directly by the author. A virtual keyboard can be provided for this purpose. A user of an e-book reader can scroll the caption text when there is more text than can fit in caption area 810.

FIGS. 9A and 9B illustrate an exemplary widget inspector 300 for presentation widget 800. FIG. 9A illustrates a layout mode for widget inspector 300 and FIG. 9B illustrates a user interaction mode for widget inspector 300.

In layout mode, the author can select a layout, title and caption settings, choose to show/hide the background frame and outer margin distance, and manually input an accessibility description, which can be read aloud during playback on an e-book reader. For example, the author can select a label style using menu 311. In some implementations, the accessibility description is automatically populated with the description for the figure label.

In interaction mode, the user can select full screen view and navigation settings 313, 315, for showing/hiding a transport control and for enabling/disabling user interaction, respectively. In addition to drag and drop, the user can add a multimedia presentation to widget 800 by entering the pathname for the file in text box 317 and pressing insert button 327.

Exemplary Movie Widget

Figure 10:
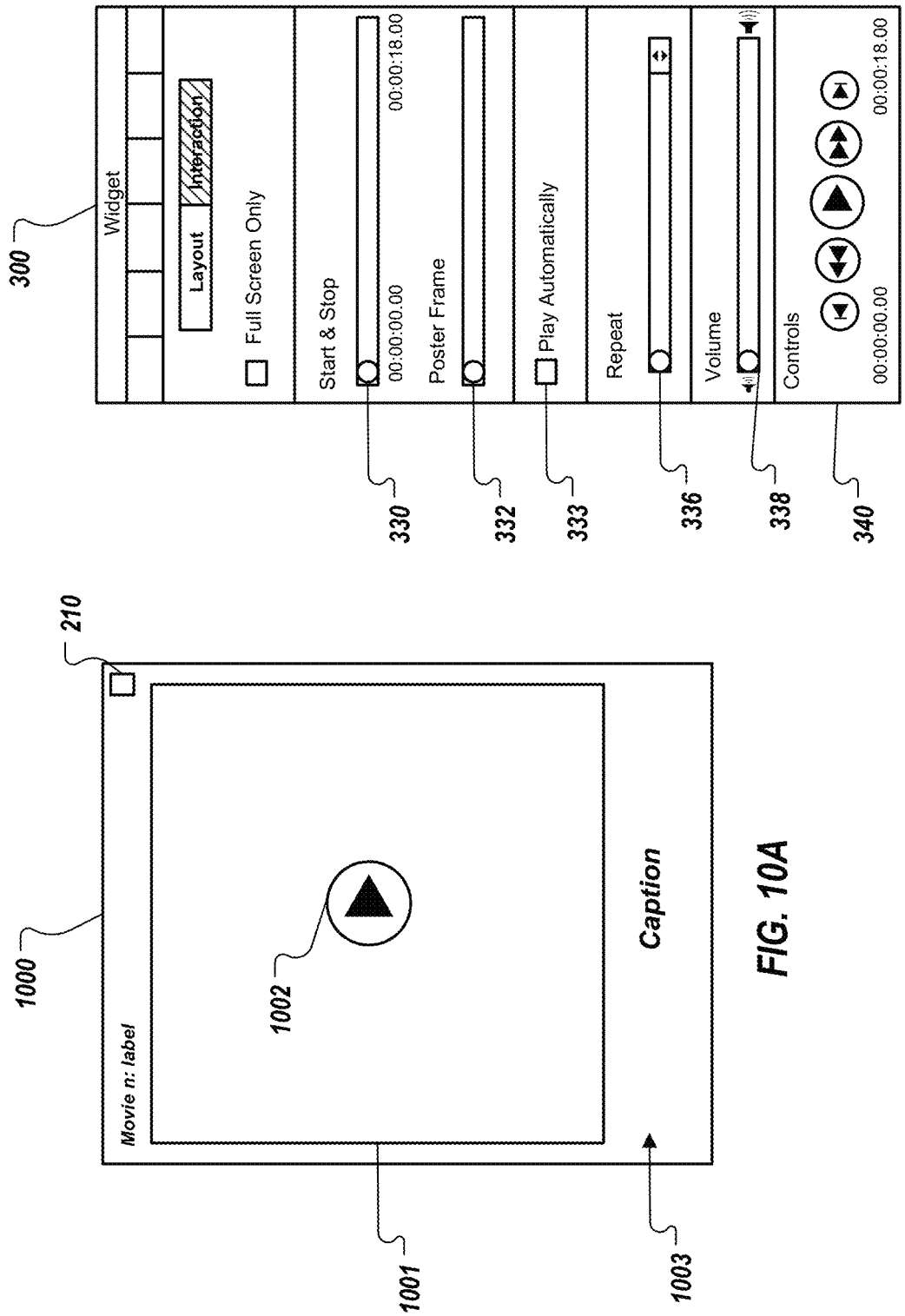
FIGS. 10A and 10B illustrate an exemplary movie widget and corresponding widget inspector.

FIGS. 10A and 10B illustrate an exemplary movie widget 1000 and corresponding widget inspector 300. FIG. 10A illustrates the components of movie widget 1000, which include a label and enumeration, video display 1001, playback control 1002 and caption area 1003. FIG. 10B illustrates the corresponding widget inspector 300. Widget inspector 300 includes start/stop control 330, poster frame control 332, play automatically setting 333, repeat control 336, volume control 338 and transport control 340. These controls allow the author to determine how video will be played in widget 1000 on an e-book reader. When the movie is playing on an e-book reader player controls can be displayed, including but not limited to a play/pause button, fast forward/reverse button, bookmark and a scrubber control.

Exemplary HTML Widget

Figure 11:
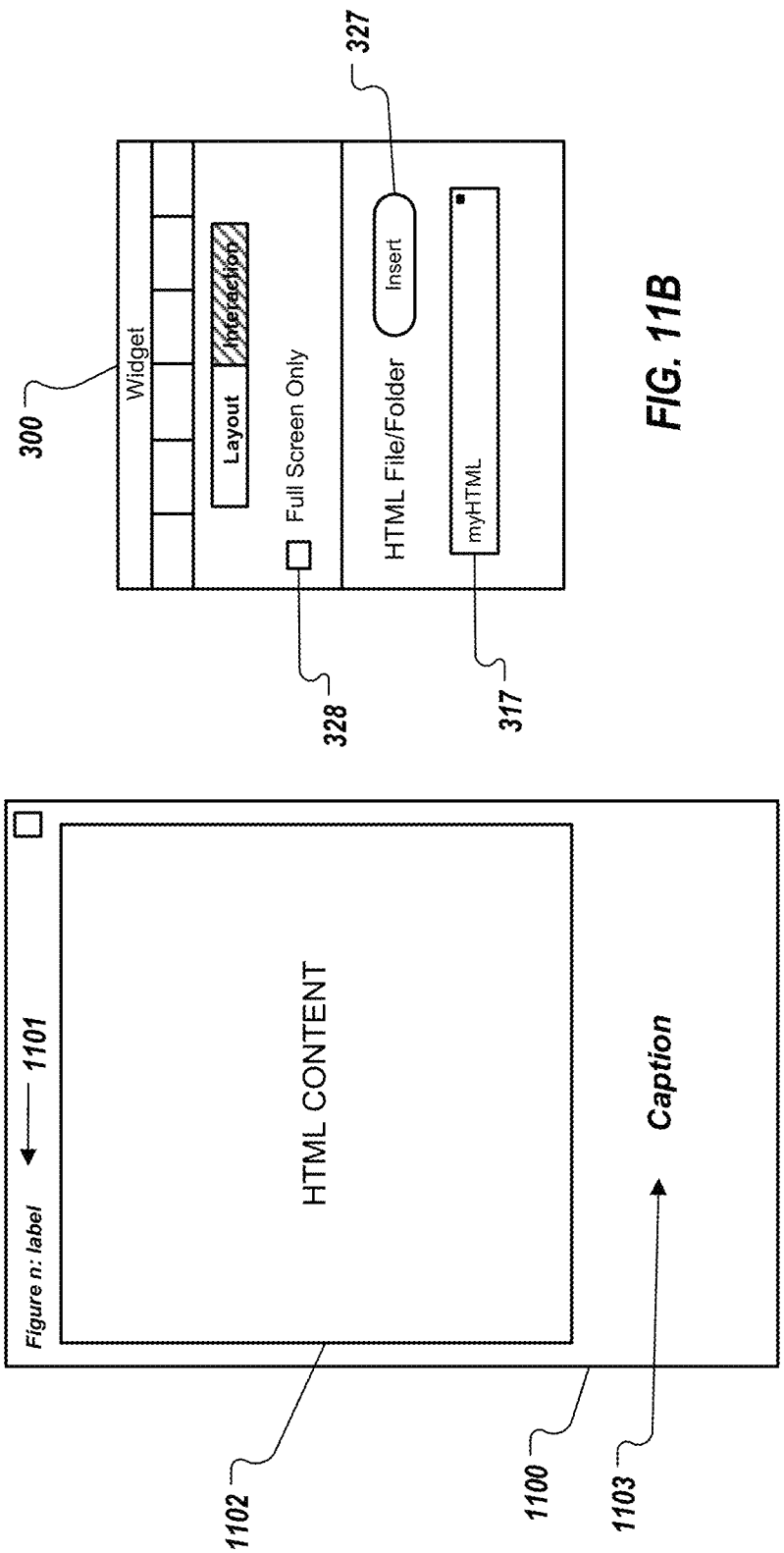
FIGS. 11A and 11B illustrate an exemplary HTML widget and corresponding widget inspector.

FIGS. 11A and 11B illustrate an exemplary HTML widget 1100 and corresponding widget inspector 300. FIG. 11A illustrates a layout of HTML widget 1100 and FIG. 11B illustrates the corresponding widget inspector 300.

HTML widget 1100 can be added to the digital book using the same drag and drop operation previously described in reference to FIG. 1. The components of HTML widget can include label 1101, media display area 1102 and caption area 1103. An author can load HyperText Markup Language (HTML) content (e.g., a Web page) by typing a pathname for the HTML file in text box 317 and pressing insert button 327. The content is displayed in media display area 1102. The author can also specify full screen view capability with setting 328.

Exemplary Review (Quiz) Widget

Figure 12:
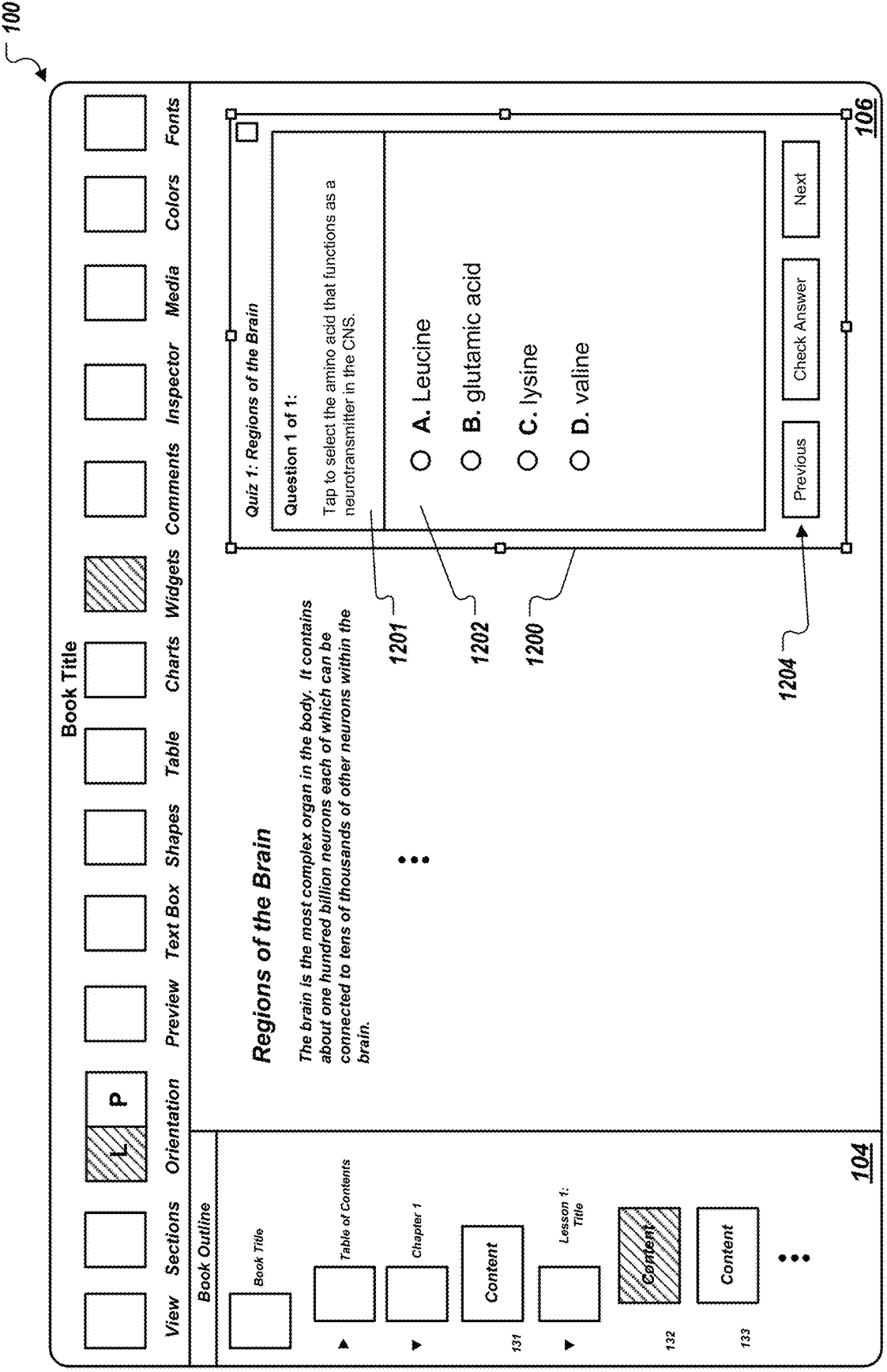
FIG. 12 illustrates an exemplary review widget.

FIG. 12 illustrates an exemplary review widget 1200 for inserting review materials (e.g., quizzes) in a digital book. Review widget 1200 can be added to the digital book using the same drag and drop method previously described in reference to FIG. 1. Review widget 1200 can be useful for textbooks, where quiz sections are often included at the end of a lesson. Review widget can display various common question types including but not limited to multiple choice, drag to target, match columns, fill-in the blanks and order lists.

In some implementations, review widget 1200 can include a label and full screen view button, which function as previously described in reference to FIG. 2. Review widget 1200 also includes question area 1201 and question type-specific answer area 1202. Answer area 1202 is where a student can select one or more answers to the question in questions area 1201. Correct answer feedback is provided to the student.

Buttons 1204 allow a student to navigate through questions and to check answers. For example, a student can use the Previous and Next buttons to navigate to a previous or next question and press the Check Answer button to check answers.

Figure 13B:
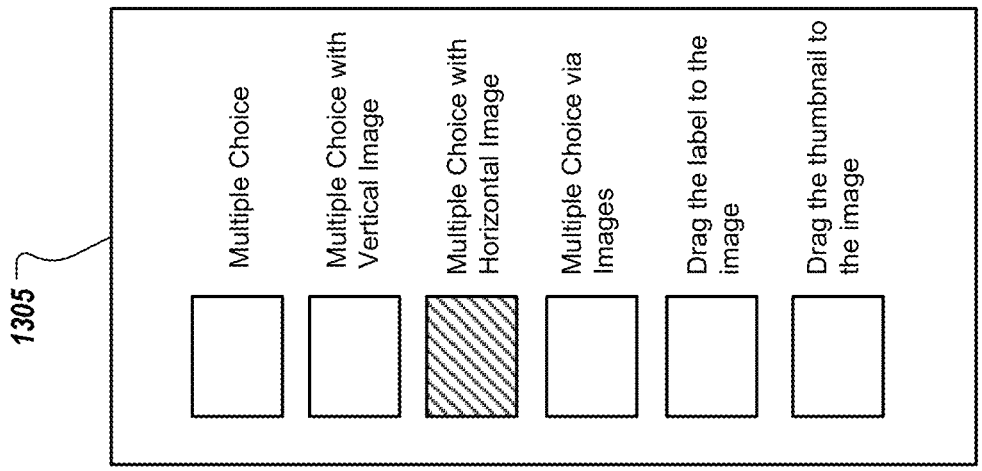
FIGS. 13A and 13B illustrate an exemplary widget inspector for the review widget.
Figure 13A:
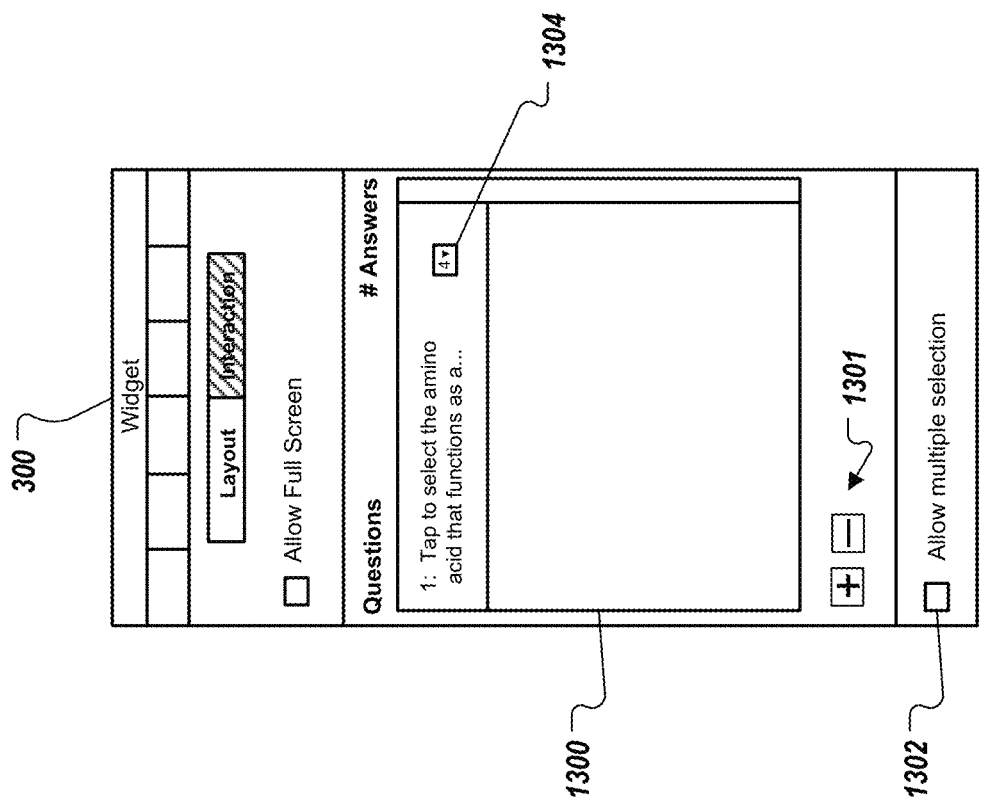

FIG. 13A illustrates an exemplary widget inspector 300 for review widget 1200. FIG. 13B illustrates various question types that can be selected by the author for review widget 1200.

In some implementations, widget inspector 300 can include a question panel 1300, "+" and "−" icons 1301 and setting 1302 for allowing multiple answers to a question. Widget inspector 300 also includes a toolbar, toggle button and setting to allow full screen view. The layout mode for review widget 1200 is the same as the other widgets previously described, and will not be described further.

Question panel 1300 includes a list of questions comprising the quiz. The author can add and delete questions using "+" and "−" icons 1301, respectively. When the author presses the + icon, menu 1305 of icons representing question types is exposed, as shown in FIG. 13B. In the example shown, question types can include but are not limited to multiple choices, multiple choice with horizontal image, multiple-choice via images, drag the label to the image, and drag the thumbnail to the image. In this example, the author selected an icon representing multiple choice with horizontal image format type, which selection is indicated by a highlighted icon in menu 1305. Setting 1302 allows the author to indicate multiple correct answers for a question.

The author can type the question directly in question area 1201 or question panel 1300. Each question has a control 1304 for selecting correct answers.

Figures 14A, 14B:
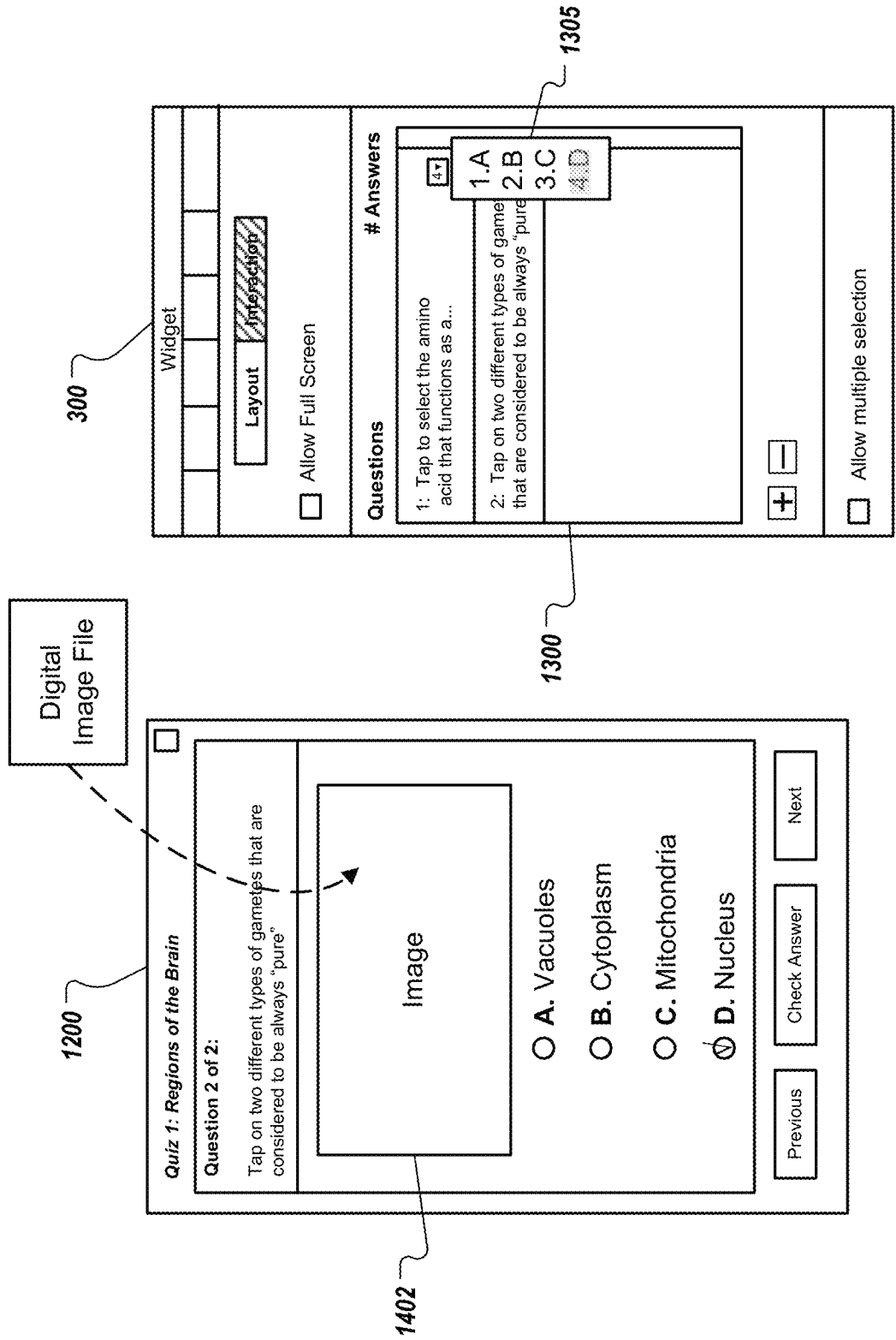
FIGS. 14A and 14B illustrate an exemplary multiple choice question widget type and corresponding widget inspector.

FIGS. 14A and 14B illustrate an exemplary review widget 1200 and corresponding inspector 300 in user interaction mode. In FIG. 13B, the author selected a multiple choice with horizontal image question format. FIG. 14A illustrates the resulting review widget 1200 that will be inserted in the digital book. As illustrated in FIG. 14B, widget inspector 300 for review widget 1200 includes two questions, each with four possible answers A, B, C and D, one of which can be selected by the author from menu 1305. In this example, FIG. 14A illustrates selecting an answer for question #2 in question list 1300 (e.g., answer D). Digital image file 1402 can be dragged from a source (e.g., desktop, media browser) directly into widget 1200.

FIGS. 15A and 15B illustrate another exemplary multiple choice question type and corresponding widget inspector 300. In this example, review widget 1200 displays question #3 in the quiz: a "multiple choice via images" question type. This question type includes a grid 1501 of four images where each image has a check circle that can be checked by a student to indicate a correct answer. As illustrated in FIG. 15B, there are three questions shown in question panel 1300 and the third question has four possible answers. Since the "allow multiple selection" 1302 setting has been checked, the student can select two of the four images as the correct answer to the question.

Figures 16A, 16B:
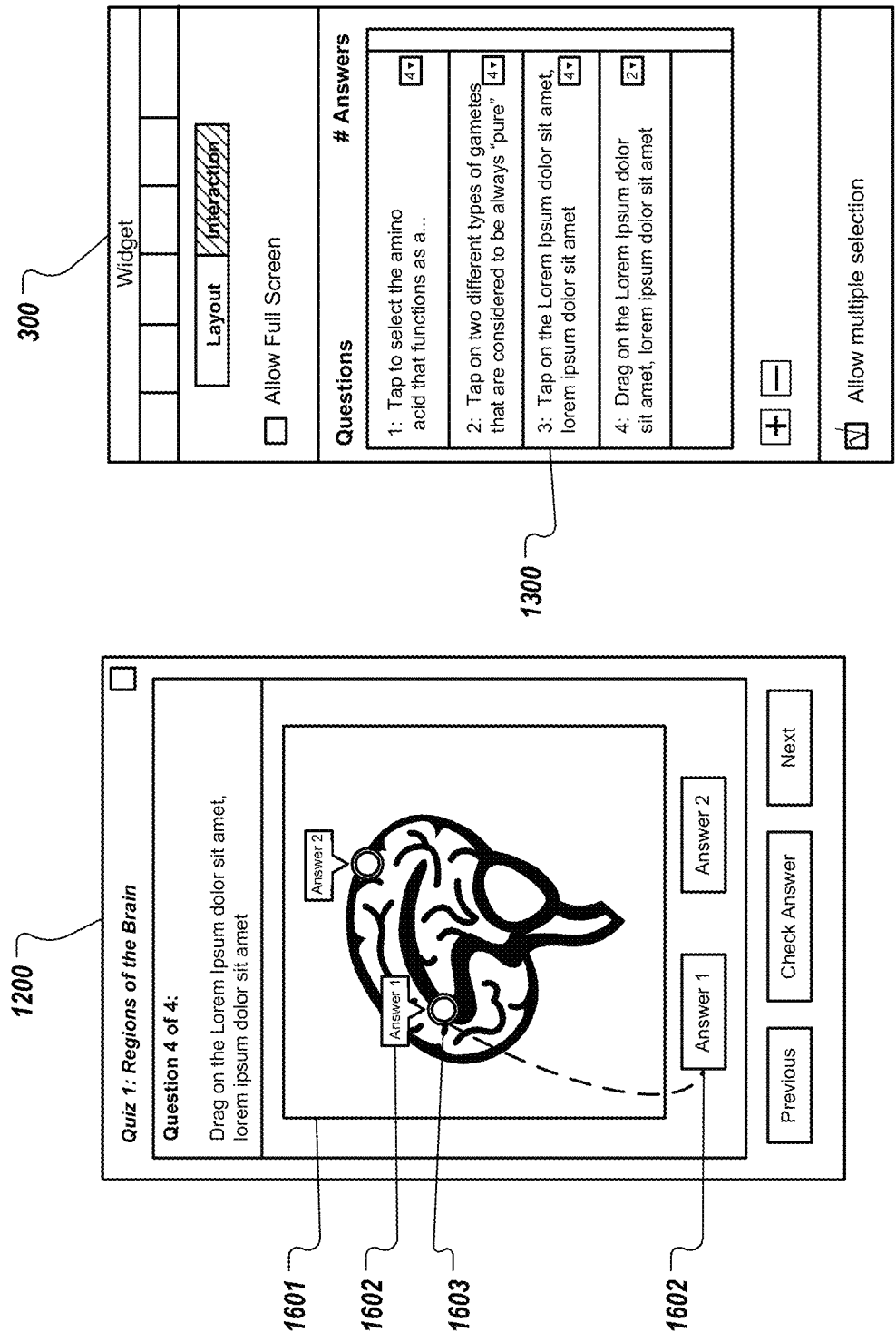
FIGS. 16A and 16B illustrate another exemplary multiple choice question type and corresponding widget inspector.

FIGS. 16A and 16B illustrate another exemplary multiple choice question type and corresponding widget inspector 300. In this example, review widget 1200 displays question #4 in the quiz: a "drag the label to image" question type. As illustrated in FIG. 16A, this question type displays an image in media display area 1601 and labels 1602. Labels 1602 have targets 1603. The student can drag a target 1603 over a location on the image to indicate an answer. Note that in this example there are two possible answers to question number 4, as indicated in question panel 1300 of widget inspector 300.

Figure 17B:
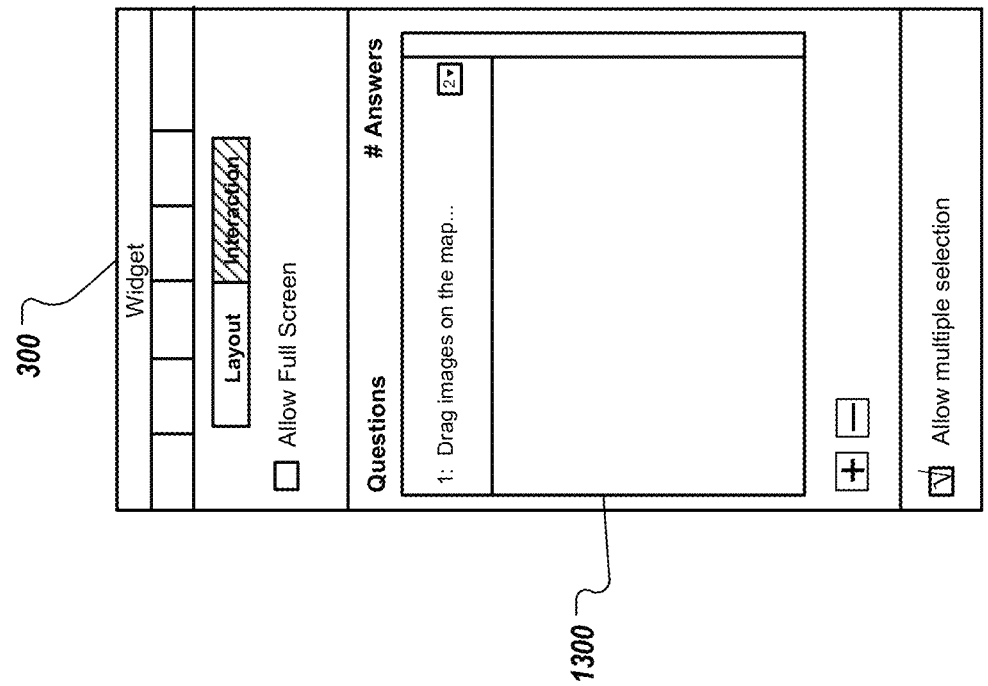
FIGS. 17A and 17B illustrate another exemplary multiple choice question type and corresponding widget inspector.
Figure 17A:
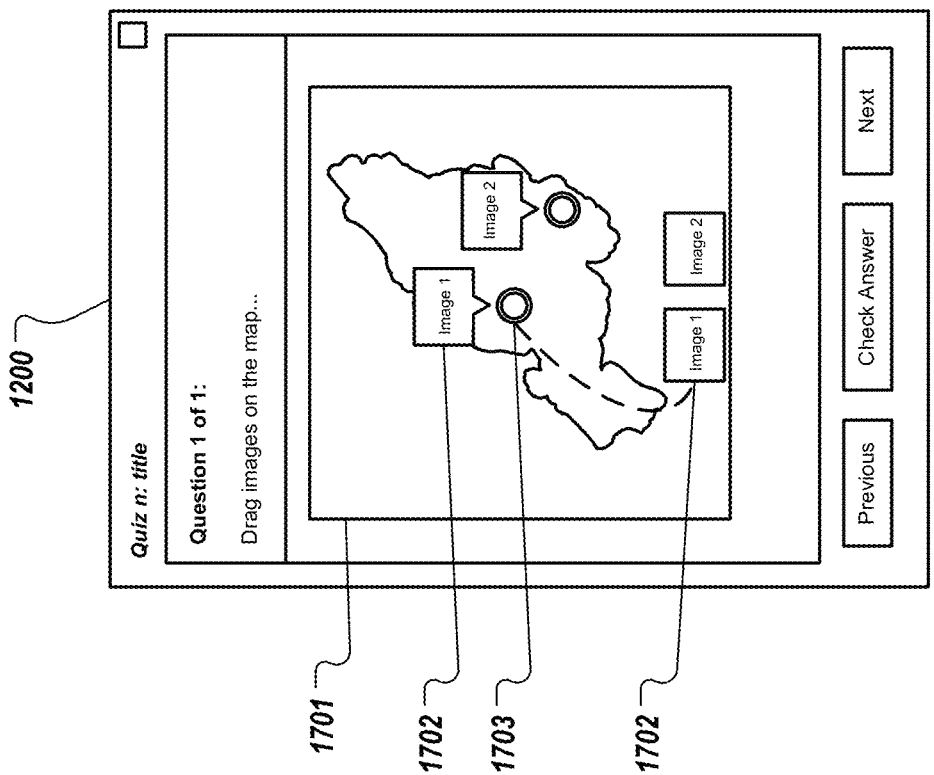

FIGS. 17A and 17B illustrate another exemplary multiple choice question type and corresponding widget inspector 300. In this example, review widget 1200 displays question #1 in the quiz: a "drag the thumbnail to image" question type. As illustrated in FIG. 17A, this question type displays an image in media display area 1701 and thumbnails 1702. Thumbnails 1702 have targets 1703. The student can drag a target 1703 over a location on the image to indicate an answer. Note that in this example there are two possible answers to question #1 as indicated in question panel 1300 of widget inspector 300.

Exemplary Visual Dictionary Widget

FIGS. 18A and 18B illustrate an exemplary visual dictionary widget 1800 and corresponding widget inspector 300, where a HUD 1804 is used to set a first zoom level for a first placard 1803. Visual dictionary widget 1800 allows an author to place placards on content displayed in media display area 1801. Content (e.g., digital image, diagram, graphical object) can be dragged and dropped into media display area 1801. Placards can be added or deleted from media display area 1801 with "+" and "−" icons. In some implementations, placards can have targets 1802, which can be dragged by the author to desired locations on the content displayed in media display area 1801.

Referring to FIG. 18A, HUD 1804 can include a slider control, which can be manipulated by the author to zoom in or out media display area 1801. The resulting zoom level is made persistent with the first placard 1803 (placard A). When a student touches or clicks on the first placard 1803 in the visual dictionary widget on an e-book reader, media display area 1801 is automatically adjusted to the zoom level specified by the author (e.g., 100% for placard A).

FIG. 18B illustrates the corresponding widget inspector 300 for visual dictionary widget 1800 in user interaction mode. Widget inspector 300 includes a setting for showing/hiding a full screen view button and a setting 1809 for showing/hiding a transport control on widget 1800. Widget inspector 300 includes view pane 1805 showing each placard. The zoom level is set for the placard that is currently highlighted in view pane 1805, which in this example is the placard A. A "same location for all descriptions" setting 1806 allows the placard descriptions to appear in the same location in the media display area 1801 when selected by a user of an e-book reader.

FIGS. 19A and 19B illustrate an exemplary visual dictionary widget 1800 and corresponding widget inspector 300, where HUD 1804 is used to set a second zoom level for a second placard 1807 (e.g., 120%) having a target 1808. The author can type a description directly in second placard 1807 by tapping or clicking placard 1807 and then typing the desired text directly into placard 1807.

Figure 20B:
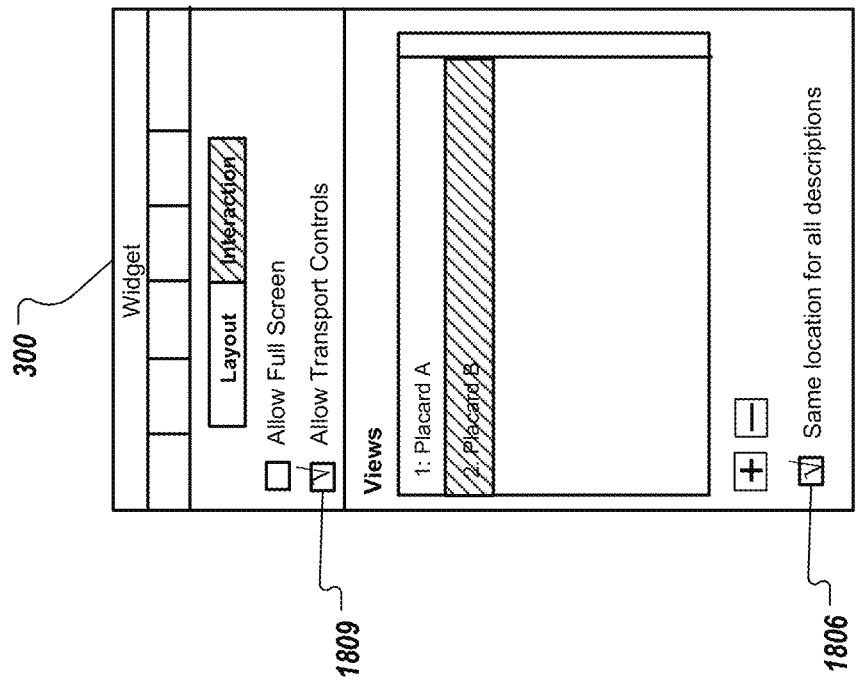
FIGS. 20A and 20B illustrate an exemplary visual dictionary widget and corresponding widget inspector, including transport controls and a fixed location for placard descriptions.
Figure 20A:
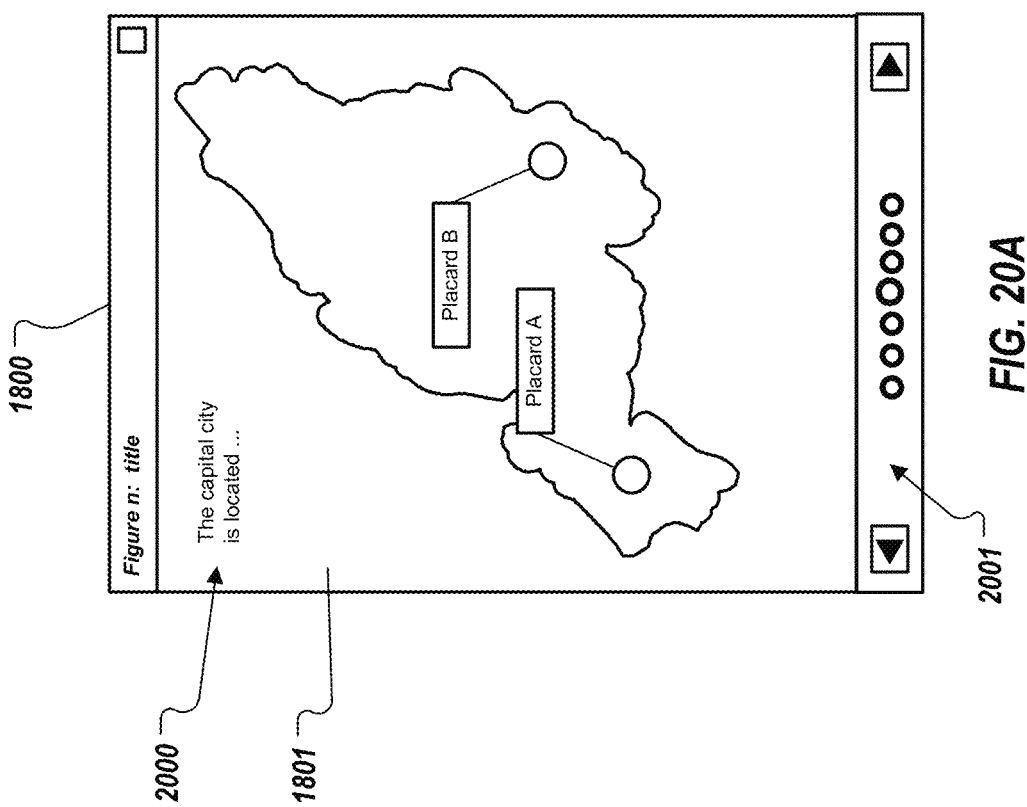

FIGS. 20A and 20B illustrate an exemplary visual dictionary widget and corresponding widget inspector 300, including transport controls 2001 and common location 2000 for placard descriptions. In this example, setting 1806 is set, forcing all placard descriptions to be shown at common location 2000. Transport controls 2001 allow a user of an e-book reader to navigate different content in visual dictionary widget 1800.

Other Exemplary Interactive Elements

In some implementations, a 3D animation widget can be inserted in a digital book. The 3D animation widget can be configured to import (e.g., through a drag and drop operation) a 3D animation file, such as a Collada file. Collada (COLLAborative Design Activity) is a well-known and publicly available open source specification that establishes an interchange file format for interactive 3D applications. Collada defines an open standard XML schema for exchanging digital assets among various graphics software applications that might otherwise store their assets in incompatible file formats. Collada documents that describe digital assets are XML files, usually identified with a .dae (digital asset exchange) filename extension.

Using a widget inspector, the author can specify animation speeds and apply settings that restrict the animation. For example, a first setting can be specified by the author to set a rotation speed of a 3D object and a second setting can be specified by the author to restrict the angle of rotation in one or more axes of rotation as desired.

Exemplary Glossary Tool Bar

Figure 21:
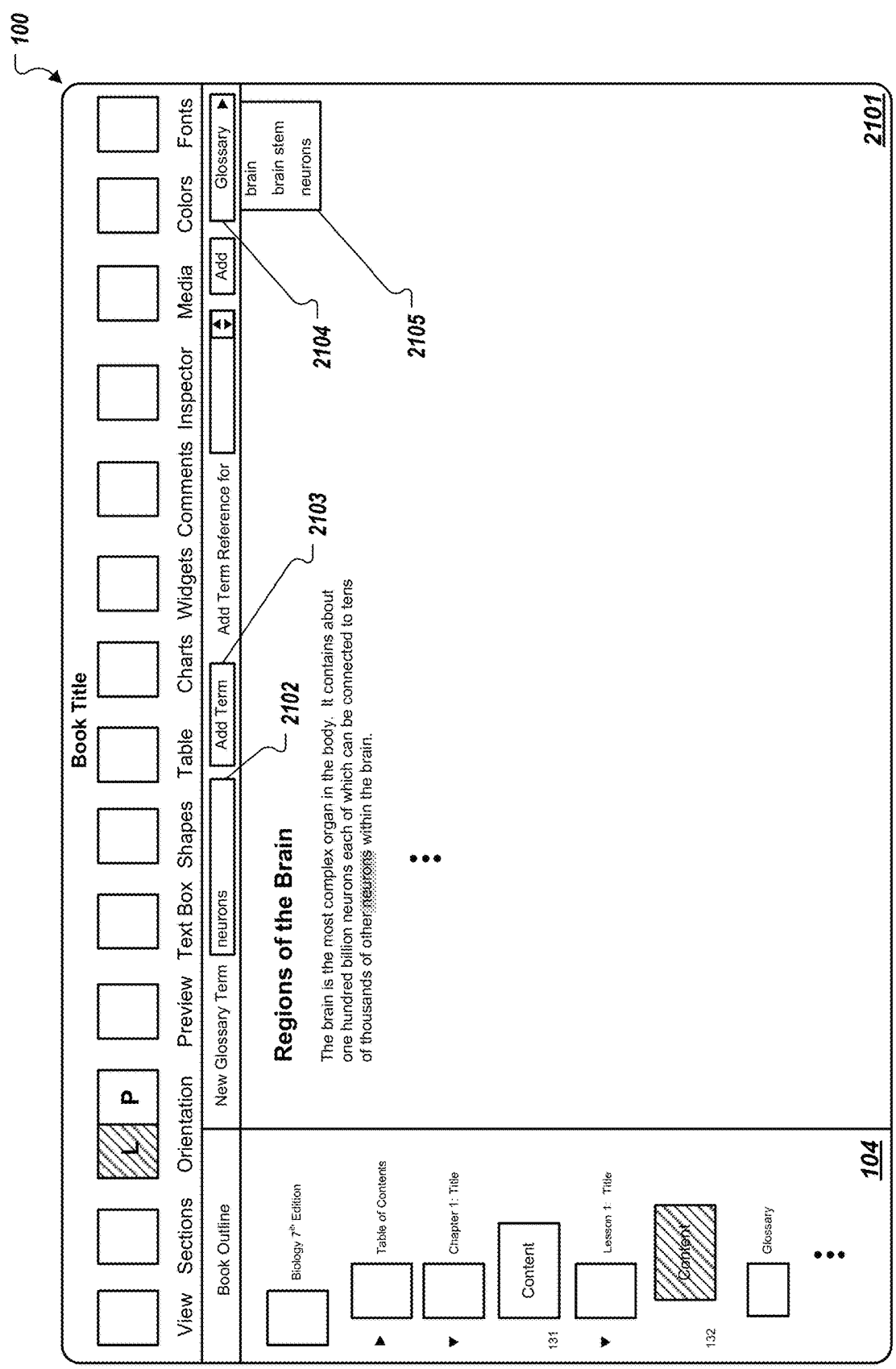
FIG. 21 illustrates an exemplary glossary tool bar.

FIG. 21 illustrates GUI 100 of FIG. 1 with an exemplary glossary tool bar 2101. Glossary toolbar 2101 can be exposed by selecting a glossary toolbar option from a drop-down menu or pressing an icon in a widget inspector 300. In some implementations, the author can populate a glossary with terms using glossary toolbar 2101. To select a term to be added to the glossary, the author can highlight the term in the text with a finger or mouse. In the example shown, the author highlighted the term "neurons." The highlighted term can automatically populate text box 2102 used for adding new glossary terms. Alternatively, the author can type the term "neurons" in text box 2102. After text box 2102 is populated, the author can press add term button 2103 to add the term to the glossary and the term can be visually embellished in the digital book to indicate its inclusion in the glossary (e.g., place a frame around the term or change its color). The author can press glossary button 2104 to see a list of glossary terms 2105, which can be displayed in alphabetical order. In some implementations, an author can designate a glossary term by highlighting the term in different colors. The different colors can be used to filter for viewing in the glossary. Glossary terms can also be auto-capitalized and de-pluralized.

Exemplary Glossary/Index Page

Figure 22:
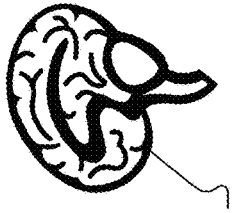
FIG. 22 illustrates an exemplary hybrid glossary/index page.

FIG. 22 illustrates an exemplary hybrid glossary/index page. The glossary/index page includes glossary panel 107, definition area 109, related glossary term area 111 and term reference area 113. The hybrid glossary/index page can be selected by the author for display in GUI 100 by selecting the glossary node 117 in sidebar 104. The hybrid glossary/index page conveniently merges a glossary and index into a single user interface. Such a feature is advantageous over conventional digital books where the glossary and index are often separated.

Glossary panel 107 can include search box 2202 and a list of glossary terms, each having a status icon 2203 for determining the status of a term. In the example shown, the terms "brain," "brain stem" and "neurons" are listed in glossary panel 107. The + and − icons can be used to add or delete terms from glossary panel 107.

Definition area 109 can be used to edit the definition of a term. Media object 2200 (or a widget) can be inserted in definition area 109 using previously described methods.

The author can relate glossary terms by dragging a glossary term from glossary panel 107 and dropping the glossary term in related glossary term area 111. In the example shown, the author dragged the term "neurons" from glossary panel 107 and dropped the term in glossary term area 111, relating the term "neurons" to the term "brain." Note that "brain" is the currently selected glossary term, as indicated by a highlight in glossary panel 107.

Figure 23:
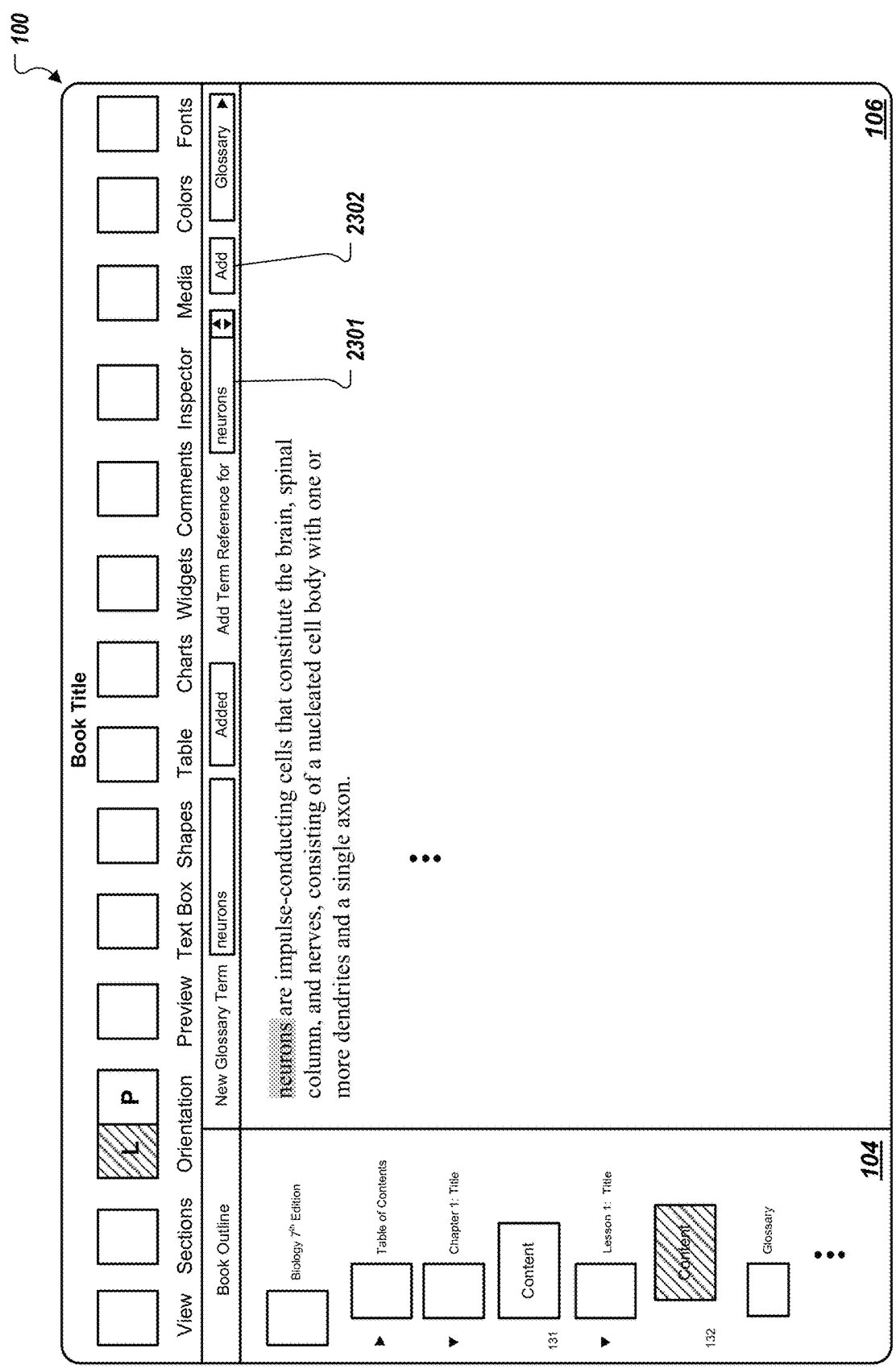
FIG. 23 illustrates an exemplary process for adding term references to the hybrid glossary/index.

FIG. 23 illustrates an exemplary process for adding term references to the glossary/index. In some implementations, a term reference can be added to the hybrid glossary/index page by highlighting the term in text. In the example shown, the author highlighted the term "neurons" using a finger or mouse, causing text box 2301 to be auto-populated with the term "neurons." The author presses add button 2302 to add a term reference for "neurons." This procedure can be repeated for each instance of the term "neurons" in the digital book. The first occurrence of a term reference is referred to as the primary definition.

Figure 24:
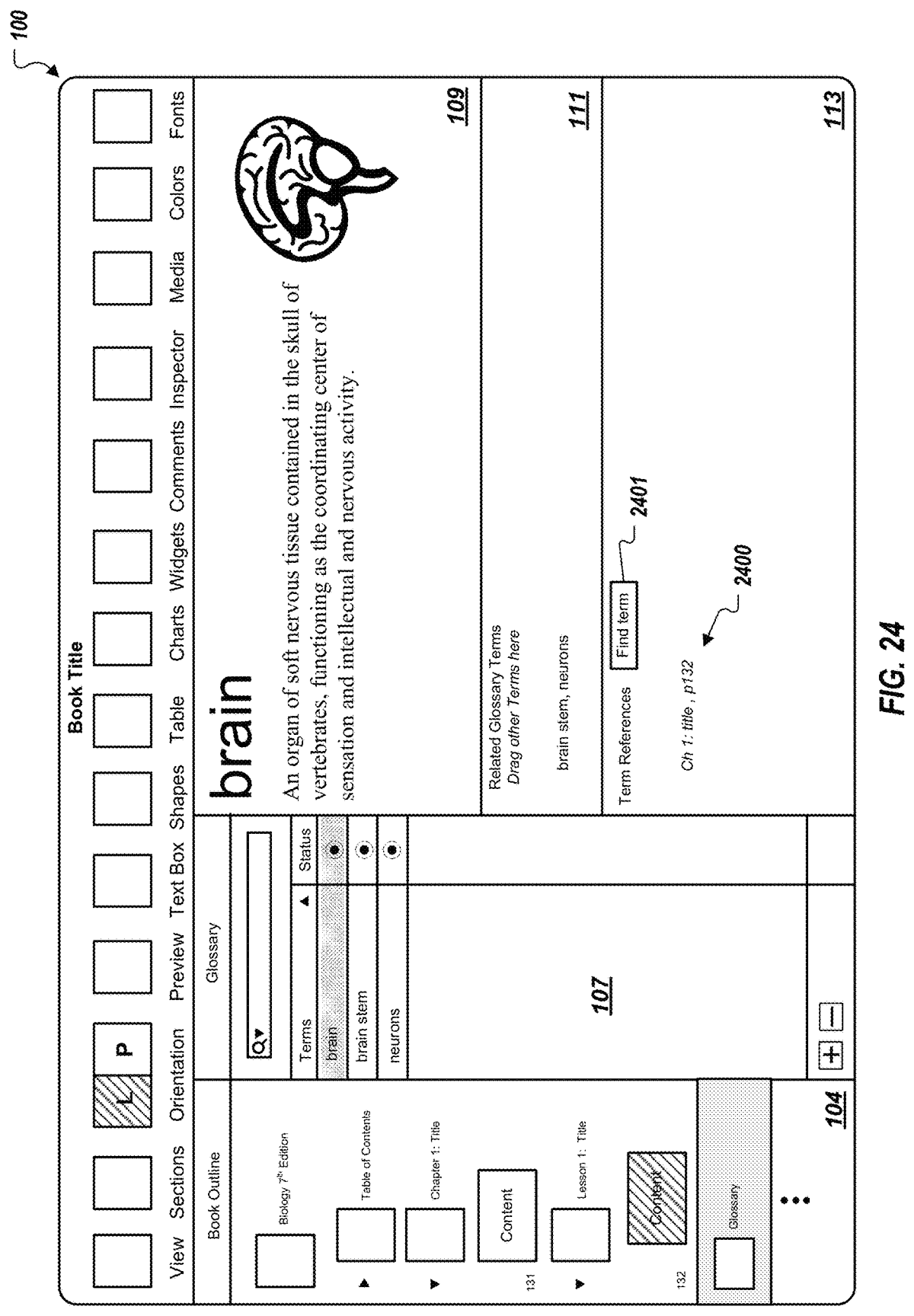

FIG. 24 illustrates an exemplary glossary/index page with an added term reference 2400. In the example shown, term reference 2400 (Ch 1: title, p132) is added to term reference area 113. Find term button 2401 can be pressed to expose a search pane to allow the author to search pages of the digital book for more instances of the term "brain," so that the author can add those instances as term references. Term references can be "links" that can be touched or clicked by a user of an e-book reader to navigate to pages in the digital book that contain the term. Term reference links can link to terms contained in text of figure labels and captions.

Figure 25:
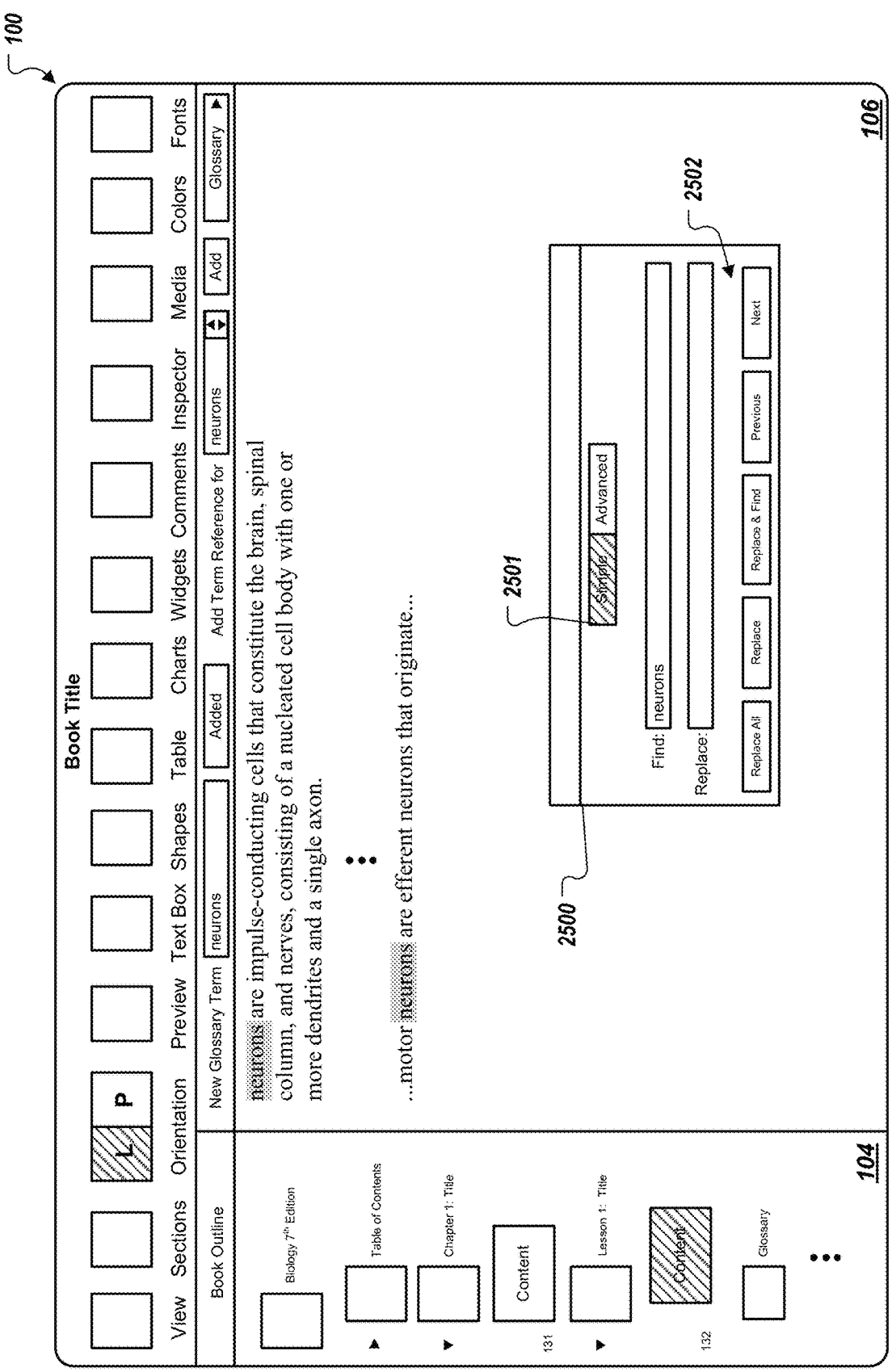
FIG. 25 illustrates an exemplary process for finding term instances in the digital book.

FIG. 25 illustrates an exemplary process for finding term instances in the digital book. Search pane 2500 can include toggle 2501 for toggling between simple and advanced search modes. In this example, simple search mode is selected, exposing Find and Replace boxes and navigation buttons 2502. The author can use search pane 2500 to navigate the digital book, finding instances of a specified term, which is the term "neurons" in this example. When instances of the term are found, the author can add the term references as previously described. Advanced search mode exposes options for creating more complex search queries.

Figure 26:
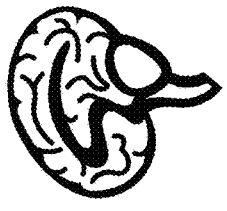
FIG. 26 illustrates an exemplary hybrid glossary/index page, including a primary definition and secondary term references.

FIG. 26 illustrates an exemplary hybrid glossary/index page including term references. In the example shown, term references include primary definition 2400 and secondary term references 2600. Button 2602 can be pressed by the author to expose secondary term references 2600. Term references 2400, 2600 can reference terms in any text of the digital book, including text contained in figure labels or captions of widgets.

Figure 27:
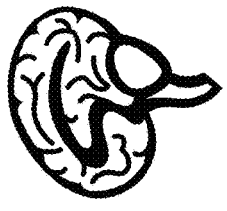
FIG. 27 illustrates an exemplary process for managing links of term references.

FIG. 27 illustrates an exemplary process for managing links of term references. In some implementations, an author can select a term reference with a finger or mouse and menu 2700 is exposed with a number of link operations. In the example shown, link operations can include but are not limited to: setting a selected term reference as a primary definition; going to a link; resetting link text; and removing a link.

Exemplary Process for Building a Digital Book

Figure 28A:
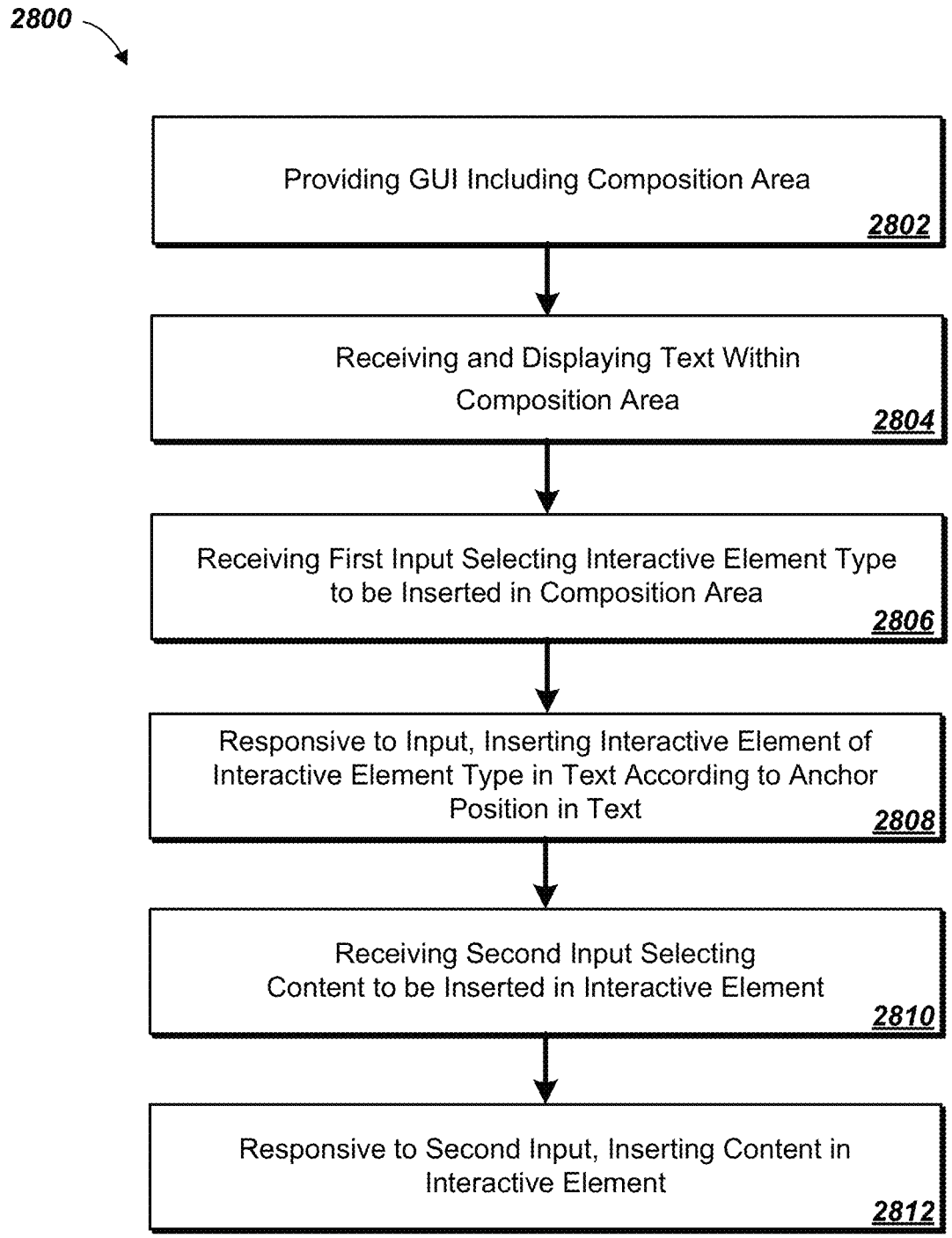

FIG. 28A is a flow diagram of an exemplary process 2800 for building a digital book. Process 2800 can be implemented by a digital book authoring application 2972 running on architecture 2900, described in reference to FIG. 29.

In some implementations, process 2800 can begin by providing a GUI including a composition area (2802) and receiving and displaying text from a text source within the composition area (2804). For example, a text file can be imported or dragged and dropped from a variety of sources, including but not limited to a desktop, a disk or imported over a network. A portion of text can be imported from a text file using copy and paste operations. When the text is received, the authoring application can automatically create one or more pages to accommodate the size of the text file. In some implementations, the author can first select a book template from a template chooser prior to importing the text. An example GUI is GUI 100 of FIG. 1, where composition area 106 displays the imported text.

Process 2800 can continue by receiving first input selecting an interactive element type from one or more interactive element types to be inserted in composition area (2806). For example, a pull-down menu can present icons representing a number of widget types (e.g., gallery widget, review widget). An author can drag the icon for the desired widget from the menu into the GUI.

Process 2800 can continue by inserting an interactive element of the selected interactive element type in the digital book according to an anchor position in the text (e.g., a user selectable anchor position) (2808), as described in reference to FIG. 2. Handles can be provided on the widget to allow the author to resize the widget in the text.

Process 2800 can continue by receiving a second input selecting content to be inserted in the interactive element (2810) and inserting the content in the interactive element (2812). For example, if the widget is a gallery widget, the user can insert or drag and drop digital images from a desktop or media browser into a media display area of the gallery widget, as described in reference to FIG. 2. The image can be resized by the author to fit or fill the media display area of the gallery widget, as described in reference to FIG. 4.

Figure 28B:
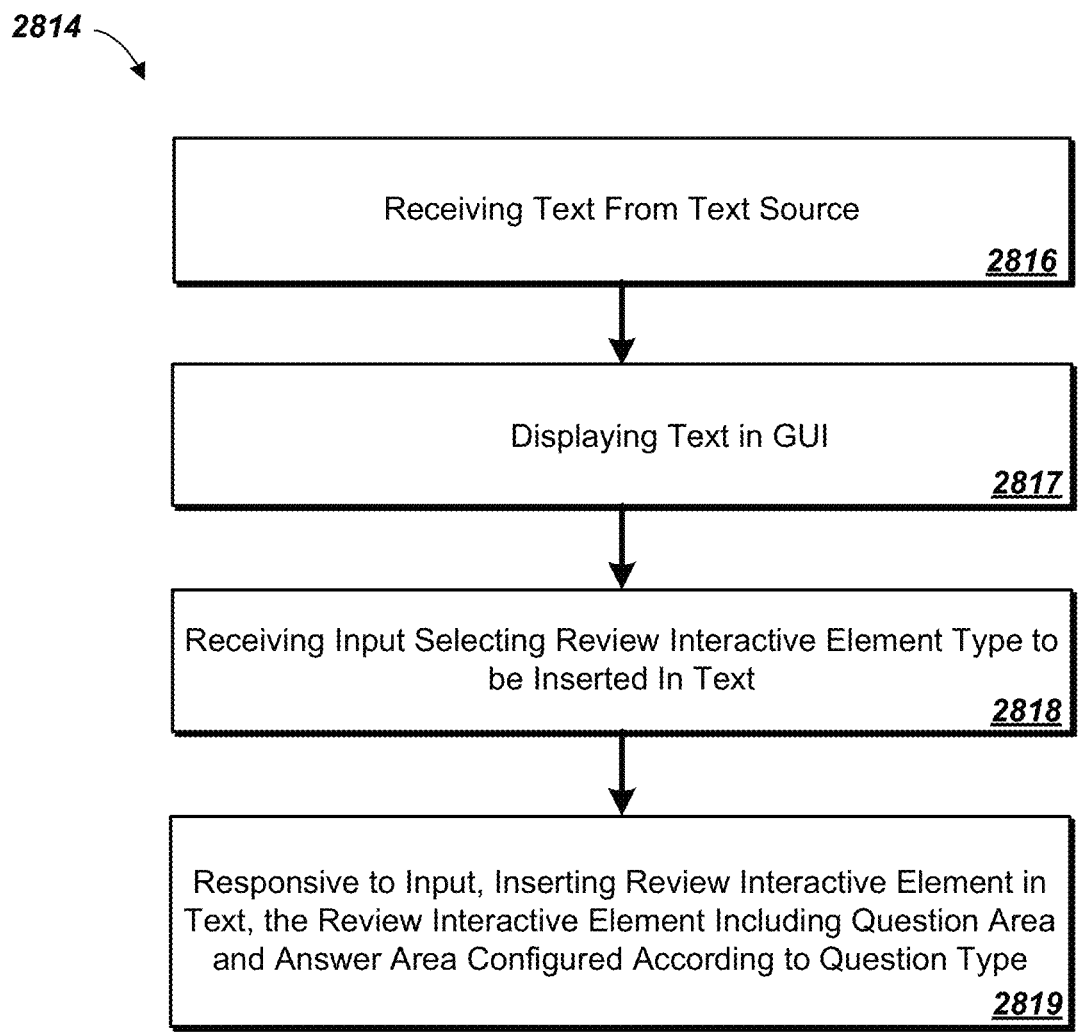

FIG. 28B is a flow diagram of an exemplary process 2814 for building a digital book. Process 2814 can be implemented by a digital book authoring application 2972 running on architecture 2900, described in reference to FIG. 29.

In some implementations, process 2814 can begin by receiving text from a text source (2816) and displaying the text in a GUI (2817).

Process 2814 can continue by receiving input selecting a review interactive element type to be inserted in text (2818), and responsive to the input, inserting a review interactive element in the text (2819). The review interactive element can include a question area for receiving a question and an answer area for receiving one or more answers to the question. The answer area can be configured according to a question type.

Figure 28C:
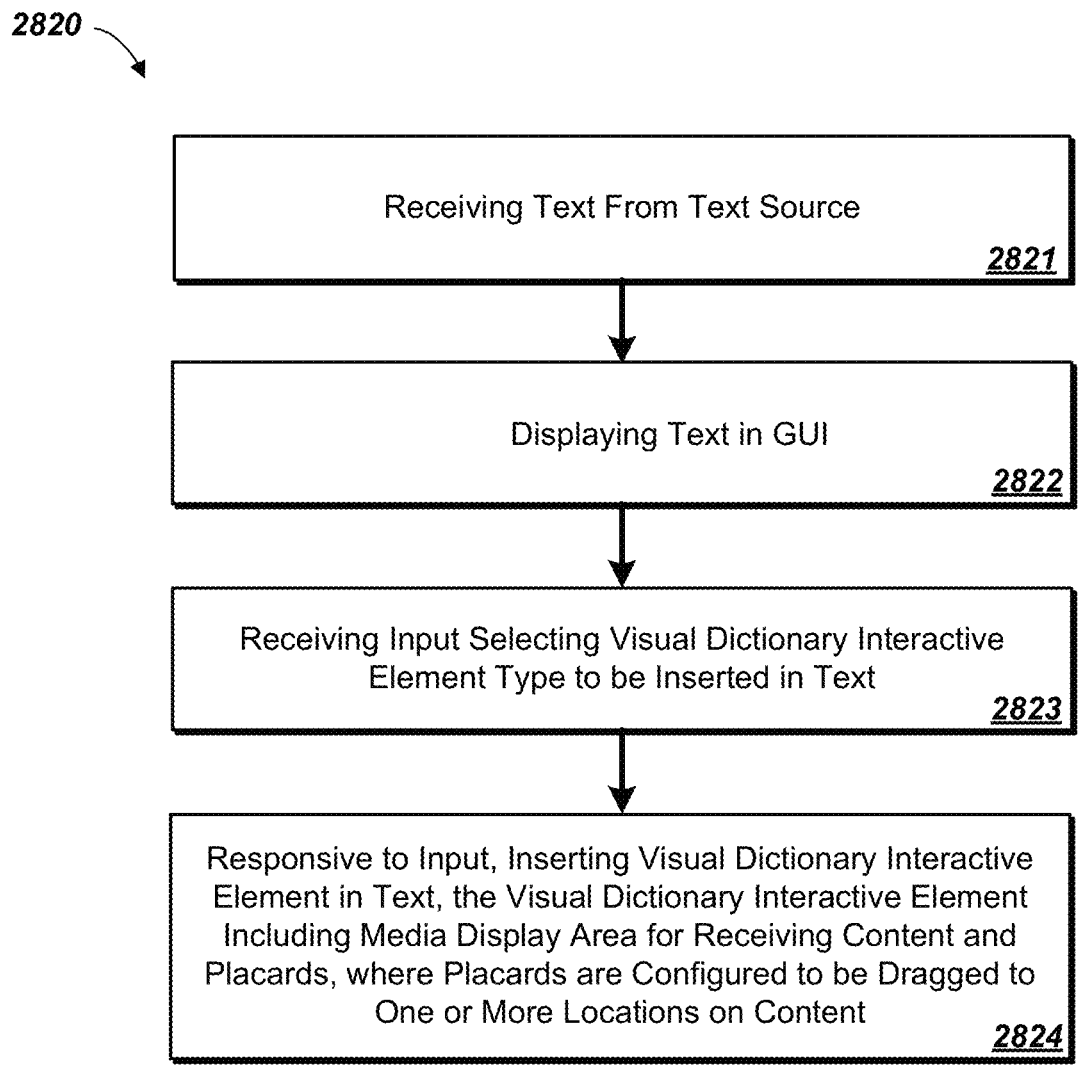

FIG. 28C is a flow diagram of an exemplary process 2820 for building a digital book. Process 2820 can be implemented by a digital book authoring application 2972 running on architecture 2900, described in reference to FIG. 29.

In some implementations, process 2820 can begin by receiving text from a text source (2821) and displaying the text in a GUI (2822).

Process 2820 can continue by receiving input selecting a visual dictionary interactive element type to be inserted in the text (2823), and responsive to the input, inserting the visual dictionary interactive element in the text. The visual dictionary interactive element can include a media display area for receiving content and placards. The placards can be configured to be dragged to one or more locations on the content (2824).

FIG. 28D is a flow diagram of an exemplary process 2825 for building a digital book. Process 2825 can be implemented by a digital book authoring application 2972 running on architecture 2900, described in reference to FIG. 29.

In some implementations, process 2825 can begin by displaying a hybrid glossary and index page for interacting with a hybrid glossary and index of a digital book (2826). The glossary and index page can include a first area displaying a definition of a first glossary term, a second area displaying a list of glossary terms including the first glossary term and other glossary terms, a third area displaying glossary terms related to the first glossary term and a fourth area displaying references to the first glossary term. Responsive to dragging a second glossary term from the list in the second area to the third area, the second glossary term is automatically related to the first glossary term (2827).

Example Device Architecture

Figure 29:
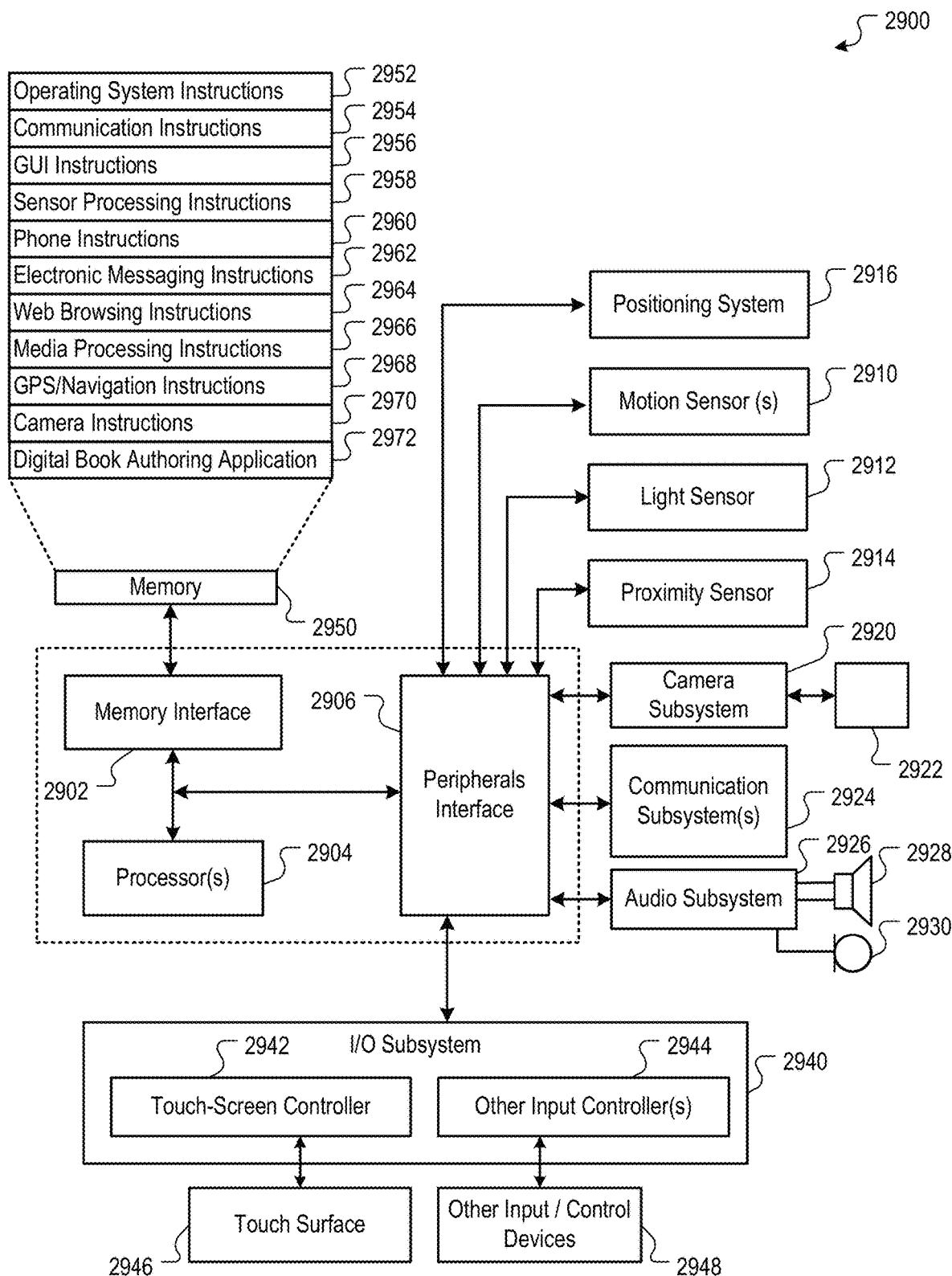
FIG. 29 is a block diagram of an example architecture for a device capable of running an application for authoring content for digital books.

FIG. 29 is a block diagram of an exemplary architecture 2900 for a device capable of running an application for authoring content for digital books. Architecture 2900 can include memory interface 2902, data processors, image processors and/or central processing units 2904 and peripherals interface 2906. Memory interface 2902, processors 2904 and/or peripherals interface 2906 can be separate components or can be integrated in one or more integrated circuits. The various components in the device can be coupled by one or more communication buses or signal lines.

Sensors, devices, and subsystems can be coupled to peripherals interface 2906 to facilitate multiple functionalities. For example, positioning system 2916, motion sensor 2910, light sensor 2912, and proximity sensor 2914 can be coupled to the peripherals interface 2906 to facilitate various positioning, orientation, lighting, and proximity functions. For example, in some implementations, light sensor 2912 can be utilized to facilitate adjusting the brightness of touch screen 2946. In some implementations, motion sensor 2911 (e.g., an accelerometer, velicometer, or gyroscope) can be utilized to detect movement of the device. Accordingly, display objects and/or media can be presented according to a detected orientation, e.g., portrait or landscape.

Other sensors can also be connected to peripherals interface 2906, such as a temperature sensor, a biometric sensor, a gyroscope, or other sensing device, to facilitate related functionalities.

Location determination functionality can be facilitated through positioning information from positioning system 2916. Positioning system 2919, in various implementations, can be a component internal to the device, or can be an external component coupled to the device (e.g., using a wired connection or a wireless connection). In some implementations, positioning system 2916 can include a Global Navigation Satellite System (GNSS) receiver or chipset, such as a Global Positioning System (GPS) receiver or chipset, and a positioning engine (e.g., including a Kalman filter) operable to derive positioning information from received GPS satellite signals. In other implementations, positioning system 2916 can include a magnetometer to provide direction indications (e.g., magnetic or true North). In still further implementations, positioning system 2916 can use wireless signals (e.g., cellular signals or 3G, WiFi or IEEE 802.11 signals) to determine location information associated with the device. Hybrid positioning can also be used. Other positioning systems are possible.

Camera subsystem 2920 and optical sensor 2922, e.g., a charged coupled device (CCD) or a complementary metal-oxide semiconductor (CMOS) optical sensor, can be utilized to facilitate camera functions, such as capturing photographs and video clips.

Communication functions can be facilitated through one or more communication subsystems 2924. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 2924 can depend on the communication network(s) or medium(s) over which the device is intended to operate. For example, the device may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 2924 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 2926 can be coupled to speaker 2928 and one or more microphones 2930. One or more microphones 2930 can be used, for example, to facilitate voice-enabled functions, such as voice recognition, voice replication, digital recording, and telephony functions.

I/O subsystem 2940 can include touch screen controller 2942 and/or other input controller(s) 2944. Touch-screen controller 2942 can be coupled to a touch surface 2946. Touch surface 2946 and touch screen controller 2942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 2946 or proximity to touch surface 2946.

Other input controller(s) 2944 can be coupled to other input/control devices 2948, such as one or more buttons, rocker switches, thumb-wheel, infrared port, USB port, and/or a pointer device such as a stylus. The one or more buttons (not shown) can include an up/down button for volume control of speaker 2928 and/or microphone 2930. A user of the device may customize a functionality of one or more of the buttons. Touch surface 2946 can be used to implement virtual or soft buttons and/or a keyboard.

In some implementations, the device can present recorded audio and/or video files, such as MP3, AAC, and MPEG files. In some implementations, the device can include the functionality of an MP3 player, such as an iPhone™.

Memory interface 2902 can be coupled to memory 2950. Memory 2950 can include high-speed random access memory and/or non-volatile memory, such as one or more magnetic disk storage devices, one or more optical storage devices, and/or flash memory (e.g., NAND, NOR). Memory 2950 can store operating system 2952, such as Darwin, RTXC, LINUX, UNIX, OS X, WINDOWS, or an embedded operating system such as VxWorks. Operating system 2952 may include instructions for handling basic system services and for performing hardware dependent tasks. In some implementations, the operating system 2952 can be a kernel (e.g., UNIX kernel).

Memory 2950 may also store communication instructions 2954 to facilitate communicating with one or more additional devices, one or more computers and/or servers. Communication instructions 2954 can also be used to select an operational mode or communication medium for use by the device, based on a geographic location (obtained by GPS/Navigation instructions 2968) of the device. Memory 2950 may include graphical user interface instructions 2956 to facilitate graphic user interface processing, such as described in reference to FIGS. 1-28; sensor processing instructions 2958 to facilitate sensor-related processing and functions; phone instructions 2960 to facilitate phone-related processes and functions; electronic messaging instructions 2962 to facilitate electronic-messaging related processes and functions; web browsing instructions 2964 to facilitate web browsing-related processes and functions; media processing instructions 2966 to facilitate media processing-related processes and functions; GPS/Navigation instructions 2968 to facilitate GPS and navigation-related processes and instructions, e.g., mapping a target location; camera instructions 2970 to facilitate camera-related processes and functions; and instructions 2972 for a content authoring application for authoring digital books, as described in reference to FIGS. 1-28. Memory 2950 may also store other software instructions (not shown), such as a search engine, Web video instructions to facilitate web video-related processes and functions; and/or Web shopping instructions to facilitate web shopping-related processes and functions. In some implementations, media processing instructions 2966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 2950 can include additional instructions or fewer instructions. Furthermore, various functions of the device may be implemented in hardware and/or in software, including in one or more signal processing and/or application specific integrated circuits.

Network-Operating Environment for a Device

Figure 30:
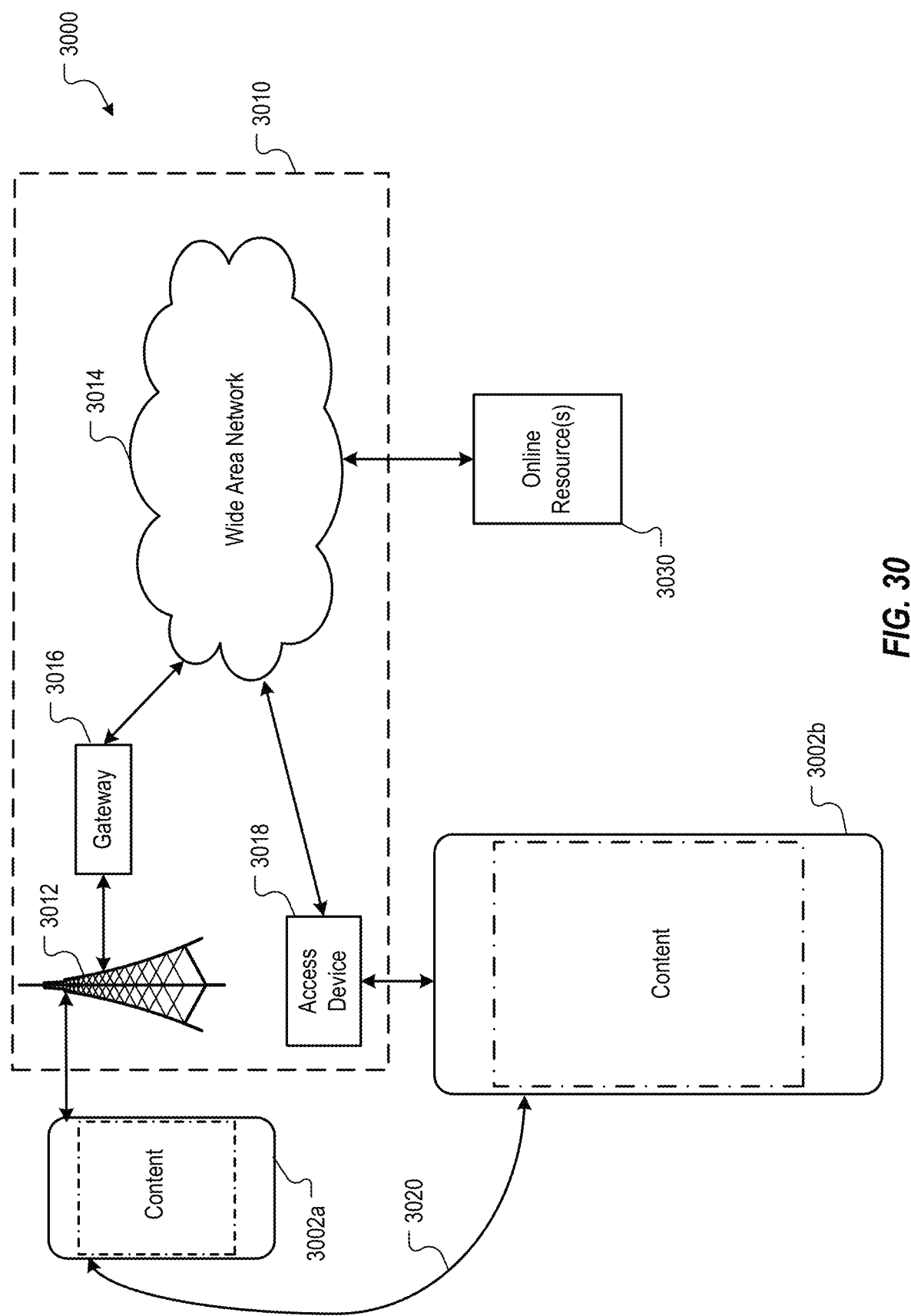
FIG. 30 is a block diagram of an example network-operating environment for the device of FIG. 29.

FIG. 30 is a block diagram of an example network-operating environment 3000 for the device of FIG. 29. Devices 3002a and 3002b can communicate data over one or more wired and/or wireless networks 3010. For example, wireless network 3012, e.g., a cellular network, can communicate with wide area network (WAN) 3014, such as the Internet, by use of gateway 3016. Likewise, access device 3018 (access point or AP)), such as an 802.11g wireless access device, can provide communication access to the wide area network 3014. In some implementations, both voice and data communications can be established over wireless network 3012 and access device 3018. For example, device 3002a can place and receive phone calls (e.g., using VoIP protocols), send and receive e-mail messages (e.g., using POP3 protocol), and retrieve electronic documents and/or streams, such as web pages, photographs, and videos, over wireless network 3012, gateway 3016, and wide area network 3014 (e.g., using TCP/IP or UDP protocols). Likewise, in some implementations, device 3002b can place and receive phone calls, send and receive e-mail messages, and retrieve electronic documents over access device 3018 and wide area network 3014. In some implementations, devices 3002a or 3002b can be physically connected to access device 3018 using one or more cables and the access device 3018 can be a personal computer. In this configuration, device 3002a or 3002b can be referred to as a "tethered" device.

Devices 3002a and 3002b can also establish communications by other means. For example, wireless device 3002a can communicate with other wireless devices, e.g., other devices 3002a or 3002b, cell phones, etc., over wireless network 3012. Likewise, devices 3002a and 3002b can establish peer-to-peer communications 3020, e.g., a personal area network, by use of one or more communication subsystems, such as a Bluetooth™ communication device. Other communication protocols and topologies can also be implemented.

Devices 3002a or 3002b can communicate with one or more services over one or more wired and/or wireless networks 3010. These services can include, for example, online resources 3030, such as an online store for accessing, purchasing, and/or downloading digital books to the devices 3002a and/or 3002b. Online resources 3030 can also include a Web-based authoring application that can be used by subscribing authors through a browser. In some implementations, online resources 3030 can include an online book publisher or publishing service. After completing a final draft of a digital book, the author can invoke a publishing application that allows the author to prepare the digital book for submission to the online publisher. The publishing application can be invoked directly from the authoring application.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, many of the examples presented in this document were presented in the context of an ebook. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of authoring content for a digital book, the method comprising:
   providing a textbook authoring tool to author a digital book;
   providing a graphical user interface (GUI) associated with the textbook authoring tool, the GUI having a composition area;
   receiving and displaying text from a text source within the composition area;
   receiving, by the tool, first authoring input selecting a container type from two or more container types to be inserted in the composition area, wherein the selected container type is associated with one or more configurable parameters that are different from configurable parameters associated with another container type;
   responsive to the first authoring input, displaying a representation of a particular container of the container type and a representation of the one or more configurable parameters, both corresponding to the text displayed within the composition area;
   receiving, by the tool, second authoring input selecting content associated with the selected container type to be inserted into the particular container;
   responsive to the second authoring input, inserting the selected content in the particular container;
   receiving, by the tool, third authoring input selecting a user interface element for configuring a configurable parameter of the one or more configurable parameters;
   responsive to the third authoring input, displaying a representation of the configurable parameter configured based on the third authoring input;
   displaying one or more selectable representations of one or more interaction parameters, wherein each interaction parameter controls whether a user is allowed to interact with the particular container in a corresponding particular way; and
   in response to a selection of a selectable representation of the one or more interaction parameters, storing, with the particular container, an indication of whether the user is allowed to interact with the particular container in a particular way.

2. The method of claim 1, further comprising:
   presenting an outline view of the digital book in the GUI according to a hierarchical structure of the digital book, the hierarchical structure being automatically determined based on paragraph styles applied to the text displayed in the GUI.

3. The method of claim 1, where the particular container includes a figure label and enumeration, the method further comprising:
   receiving, by the tool, fourth authoring input causing the particular container to move to a different location in the digital book;
   determining that an order of other containers of the container type inserted in the digital book are out of sequential order; and
   automatically updating the enumeration on each of the other containers of the container type in the digital book to be in sequential order.

4. The method of claim 1, where the container type is a gallery container having a media display area for displaying the content and the content is a gallery of digital images, the method further comprising:

displaying a series of thumbnail images corresponding to the gallery of digital images;

receiving, by the tool, authoring touch gesture input directed to the thumbnail images; and responsive to the authoring touch gesture input, replacing a first digital image of the gallery that is currently displayed in the media display area with another digital image from the gallery.

5. The method of claim 1, further comprising:

displaying an accessibility description area in the user interface element; and receiving, by the tool, authoring text input in the accessibility description area.

6. The method of claim 1, further comprising:

receiving a command to generate for display a graphical user interface associated with the particular container;

retrieving the indication of whether the user is allowed to interact with the particular container in the given way; and determining, based on the indication, whether the user is allowed to interact with the particular container in the given way.

7. The method of claim 6, further comprising, in response to determining that the user is allowed to interact with the particular container in the given way, displaying a graphical element enabling the user to interact with the particular container in the given way.

8. The method of claim 6, further comprising, in response to determining that the user is not allowed to interact with the particular container in the given way, refraining from displaying the graphical element.

9. The method of claim 1, wherein displaying the representation of the particular container of the container type and the representation of the one or more configurable parameters comprises:

displaying a selectable representation of a plurality of layout parameters;

receiving a selection of a layout parameter of the plurality of layout parameters; and updating a data structure associated with the particular container to use a layout associated with the selected layout parameter.

10. A method of authoring content for a digital book, the method comprising:

providing a textbook authoring tool to author a digital book;

providing a graphical user interface (GUI) associated with the textbook authoring tool;

receiving and displaying text from a text source in the GUI;

receiving, by the tool, first authoring input selecting a review container type to be inserted in the text displayed in the GUI, wherein the review container type is associated with one or more configurable parameters that are different from configurable parameters associated with another container type;

responsive to the first authoring input, determining that the review container type is associated with a question area configurable parameter and an answer area configurable parameter;

displaying a representation of a review container of the review container type in the text, the review container including a question area for receiving a question and an answer area for receiving one or more answers to the question, where the question is selected from a question type, and the answer area is configured according to the question selected from the question type;

receiving, by the tool, second authoring input selecting a user interface element for configuring the question area configurable parameter or the answer area configurable parameter;

responsive to the second authoring input, displaying the user interface element in the GUI;

displaying one or more selectable representations of one or more interaction parameters, wherein each interaction parameter controls whether a user is allowed to interact with the review container in a corresponding particular way; and in response to a selection of a selectable representation of the one or more interaction parameters, storing, with the review container, an indication of whether the user is allowed to interact with the review container in a particular way.

11. The method of claim 10, where the question type includes specifying one or more digital images as the one or more answers to the question.

12. The method of claim 10, where the question type includes associating one or more labels or thumbnail images to one or more locations on a digital image to indicate the one or more answers to the question.

13. The method of claim 10, where determining subsequent reader interaction with changing aspects of the question area and the answer area inserted in the review container within the digital book during display of the review container of the digital book includes specifying more than one of the one or more answers to the question.

14. A method of authoring content for a digital book, the method comprising:

providing a textbook authoring tool to author a digital book;

providing a graphical user interface (GUI) associated with the textbook authoring tool;

receiving and displaying text from a text source in the GUI;

receiving, by the tool, first authoring input selecting a visual dictionary container type to be inserted in the text displayed in the GUI, wherein the visual dictionary container type is associated with one or more configurable parameters that are different from configurable parameters associated with another container type;

responsive to the first authoring input, determining that the visual dictionary container type is associated with a media display area for receiving content and one or more placards configured to be dragged to one or more locations on the content;

displaying a representation of a visual dictionary container in the text, the visual dictionary container including a media display area for receiving content and one or more placards configured to be dragged to one or more locations on the content;

receiving, by the tool, second authoring input selecting a user interface element for configuring the media display area for receiving content and the one or more placards configured to be dragged to one or more locations on the content;

responsive to the second authoring input, displaying the user interface element in the GUI;

displaying one or more selectable representations of one or more interaction parameters, wherein each interaction parameter controls whether a user is allowed to interact with the visual dictionary container in a corresponding particular way; and in response to a selection of a selectable representation of the one or more interaction parameters, storing, with the visual dictionary container, an indication of whether the user is allowed to interact with the visual dictionary container in a particular way.

15. The method of claim 14, further comprising:
receiving, by the tool, authoring text input for the one or more placards.

16. The method of claim 14, where the user interface element is configured to receive, by the tool, third authoring input for specifying the same location in the container for display of authoring text input for the one or more placards.

17. The method of claim 14, where the user interface element is configured to receive, by the tool, third authoring input for inserting a transport control in the visual dictionary container for navigating content within the digital book.

18. The method of claim 14, further comprising:
displaying a control configured to receive third authoring input for adjusting the zoom level of the content in the media display area; and
associating the zoom level with the one or more placards.

19. A system for authoring content for a digital book, comprising:
one or more processors;
memory coupled to the one or more processors and configured for storing instructions, which, when executed by the one or more processors, performs operations comprising:
providing a textbook authoring tool to author a digital book;
providing a graphical user interface (GUI) associated with the textbook authoring tool, the GUI having a composition area;
receiving and displaying text from a text source within the composition area;
receiving, by the tool, first authoring input selecting a container type from two or more container types to be inserted in the composition area, wherein the selected container type is associated with one or more configurable parameters that are different from configurable parameters associated with another container type;
responsive to the first authoring input, displaying a representation of a particular container of the container type and a representation of the one or more configurable parameters, both corresponding to the text displayed in the composition area;
receiving, by the tool, second authoring input selecting content associated with the selected container type to be inserted into the particular container;
responsive to the second authoring input, inserting the selected content in the particular container;
receiving, by the tool, third authoring input selecting a user interface element for configuring a configurable parameter of the one or more configurable parameters;
responsive to the third authoring input, displaying a representation of the configurable parameter configured based on the third authoring input;
displaying one or more selectable representations of one or more interaction parameters, wherein each interaction parameter controls whether a user is allowed to interact with the particular container in a corresponding particular way; and
in response to a selection of a selectable representation of the one or more interaction parameters, storing, with the particular container, an indication of whether the user is allowed to interact with the particular container in a particular way.

20. The system of claim 19, wherein the operations further comprise:
presenting an outline view of the digital book in the GUI according to a hierarchical structure of the digital book, the hierarchical structure being automatically determined based on paragraph styles applied to the text displayed in the GUI.

21. The system of claim 19, where receiving text from a text source within the composition area further comprises:
automatically creating one or more pages for receiving the text, where the number of pages is based on an amount of text received within the composition area.

22. The system of claim 19, where the particular interactive element includes a figure label and enumeration, the operations further comprising:
receiving, by the tool, fourth authoring input causing the particular container to move to a different location in the digital book;
determining that an order of other containers of the container type inserted in the digital book are out of sequential order; and
automatically updating the enumeration on each of the other containers of the container type in the digital book to be in sequential order.

23. The system of claim 19, where the container type is a gallery container having a media display area for displaying the content and the content is a gallery of digital images, the operations further comprising:
displaying a series of thumbnail images corresponding to the gallery of digital images;
receiving, by the tool, authoring touch gesture input directed to the thumbnail images; and
responsive to the authoring touch gesture input, replacing a first digital image of the gallery that is currently displayed in the media display area with another digital image from the gallery.

24. The system of claim 19, wherein the operations further comprise:
receiving a command to generate for display a graphical user interface associated with the particular container;
retrieving the indication of whether the user is allowed to interact with the particular container in the given way; and
determining, based on the indication, whether the user is allowed to interact with the particular container in the given way.

25. The system of claim 24, further comprising, in response to determining that the user is allowed to interact with the particular container in the given way, displaying a graphical element enabling the user to interact with the particular container in the given way.

26. The system of claim 24, further comprising, in response to determining that the user is not allowed to interact with the particular container in the given way, refraining from displaying the graphical element.

27. The system of claim 19, wherein displaying the representation of the particular container of the container type and the representation of the one or more configurable parameters comprises:
displaying a selectable representation of a plurality of layout parameters;
receiving a selection of a layout parameter of the plurality of layout parameters; and
updating a data structure associated with the particular container to use a layout associated with the selected layout parameter.

28. A system of authoring content for a digital book, comprising:
  one or more processors;
  memory coupled to the one or more processors and configured for storing instructions, which, when executed by the one or more processors, performs operations comprising:
    providing a textbook authoring tool to author a digital book;
    providing a graphical user interface (GUI) associated with the textbook authoring tool;
    receiving and displaying text from a text source in the GUI;
    receiving, by the tool, first authoring input selecting a review container type to be inserted in the text displayed in the GUI, wherein the review container type is associated with one or more configurable parameters that are different from configurable parameters associated with another container type;
    responsive to the first authoring input, determining, based on a type of the review container, that the review container type is associated with a question area configurable parameter and an answer area configurable parameter;
    displaying a representation of a review container of the review container type in the text, the review container including a question area for receiving a question and an answer area for receiving one or more answers to the question, where the question is selected from a question type, and the answer area is configured according to the question selected from the question type;
    receiving, by the tool, second authoring input selecting a user interface element for configuring the question area configurable parameter or the answer area configurable parameter;
    responsive to the second authoring input, displaying the user interface element in the GUI;
    displaying one or more selectable representations of one or more interaction parameters, wherein each interaction parameter controls whether a user is allowed to interact with the review container in a corresponding particular way; and
    in response to a selection of a selectable representation of the one or more interaction parameters, storing, with the review container, an indication of whether the user is allowed to interact with the review container in a particular way.

29. The system of claim 28, where the question type includes specifying one or more digital images as the one or more answers to the question.

30. The system of claim 28, where the question type includes associating one or more labels or thumbnail images to one or more locations on a digital image to indicate the one or more answers to the question.

31. The system of claim 28, where determining subsequent reader interaction with changing aspects of the question area and the answer area inserted in the review container within the digital book during display of the review container of the authored book includes specifying more than one of the one or more answers to the question.

32. A system of authoring content for a digital book, the system comprising:
  one or more processors;
  memory coupled to the one or more processors and configured for storing instructions, which, when executed by the one or more processors, performs operations comprising:
    providing a textbook authoring tool to author a digital book;
    providing a graphical user interface (GUI) associated with the textbook authoring tool;
    receiving and displaying text from a text source in the GUI;
    receiving, by the tool, first authoring input selecting a visual dictionary container type to be inserted in the text displayed in the GUI, wherein the visual dictionary container type is associated with one or more configurable parameters that are different from configurable parameters associated with another container type;
    responsive to the first authoring input, determining, based on a type of the visual dictionary container, that the visual dictionary container type is associated with a media display area for receiving content and one or more placards configured to be dragged to one or more locations on the content;
    displaying a representation of a visual dictionary container in the text, the visual dictionary container including a media display area for receiving content and one or more placards configured to be dragged to one or more locations on the content;
    receiving, by the tool, second authoring input selecting a user interface element for configuring the media display area for receiving content and the one or more placards configured to be dragged to one or more locations on the content;
    responsive to the second authoring input, displaying the user interface element in the GUI;
    displaying one or more selectable representations of one or more interaction parameters, wherein each interaction parameter controls whether a user is allowed to interact with the visual dictionary container in a corresponding particular way; and
    in response to a selection of a selectable representation of the one or more interaction parameters, storing, with the visual dictionary container, an indication of whether the user is allowed to interact with the visual dictionary container in a particular way.

33. The system of claim 32, further comprising:
  receiving, by the tool, authoring text input for the one or more placards.

34. The system of claim 32, where the user interface element is configured to receive, by the tool, third authoring input for specifying the same location in the visual dictionary container for display of authoring text input for the one or more placards.

35. The system of claim 32, where the user interface element is configured to receive, by the tool, third authoring input for inserting a transport control in the visual dictionary container for navigating content within the digital book.

36. The system of claim 32, further comprising:
  displaying a control configured to receive, by the tool, third authoring input for adjusting the zoom level of the content in the media display area; and
  associating the zoom level with the one or more placards.

* * * * *